United States Patent
Cox et al.

(10) Patent No.: US 10,651,886 B2
(45) Date of Patent: May 12, 2020

(54) SAME-APERTURE ANY-FREQUENCY SIMULTANEOUS TRANSMIT AND RECEIVE COMMUNICATION SYSTEM

(71) Applicant: Photonic Systems, Inc., Billerica, MA (US)

(72) Inventors: Charles H. Cox, Carlisle, MA (US); Edward I. Ackerman, Needham, MA (US)

(73) Assignee: Photonic Systems, Inc., Billerica, MA (US)

( * ) Notice: Subject to any disclaimer, the term of this patent is extended or adjusted under 35 U.S.C. 154(b) by 0 days.

(21) Appl. No.: 16/540,584

(22) Filed: Aug. 14, 2019

(65) Prior Publication Data
US 2019/0372616 A1 Dec. 5, 2019

Related U.S. Application Data

(63) Continuation of application No. 15/901,729, filed on Feb. 21, 2018, now Pat. No. 10,425,121, which is a (Continued)

(51) Int. Cl.
*H04B 1/38* (2015.01)
*H04B 1/56* (2006.01)
(Continued)

(52) U.S. Cl.
CPC ............... *H04B 1/56* (2013.01); *G01S 7/034* (2013.01); *H04B 1/48* (2013.01); *G01S 7/023* (2013.01);
(Continued)

(58) Field of Classification Search
None
See application file for complete search history.

(56) References Cited

U.S. PATENT DOCUMENTS 2,973,512 A 2/1961 Walsh
4,719,412 A 1/1988 d'Humieres et al.
(Continued)

FOREIGN PATENT DOCUMENTS

AU 2008227105 4/2013
CN 101246540 A 8/2008
(Continued)

OTHER PUBLICATIONS

"Amendment and Response for RCE" for U.S. Appl. No. 14/417,122, filed Oct. 13, 2017, 31 pages.
(Continued)

*Primary Examiner* — Tuan A Tran
(74) *Attorney, Agent, or Firm* — Kurt Rauschenbach; Rauschenbach Patent Law Group, PLLC

(57) ABSTRACT

A same-aperture any-frequency simultaneously transmit and receive (STAR) system includes a signal connector having a first port electrically coupled to an antenna, a second port electrically coupled to a transmit signal path, and a third port electrically coupled to receive signal path. The signal connector passes a transmit signal in the transmit signal path to the antenna and a receive signal in the receive signal path. A signal isolator is positioned in the transmit signal path to remove a residual portion of the receive signal from transmit signal path. An output of the signal isolator provides a portion of the transmit signal with the residual portion of the receive signal removed. A signal differencing device having a first input electrically coupled to the output of the signal isolator and a second input electrically coupled to the third port of the signal connector subtracts a portion of the transmit signal in the receive signal path thereby providing a more accurate receive signal.

13 Claims, 25 Drawing Sheets

Related U.S. Application Data continuation of application No. 13/844,180, filed on Mar. 15, 2013, now Pat. No. 9,935,680.

(60) Provisional application No. 61/755,044, filed on Jan. 22, 2013, provisional application No. 61/677,366, filed on Jul. 30, 2012.

(51) Int. Cl.
| | |
|---|---|
| *H04B 1/48* | (2006.01) |
| *G01S 7/03* | (2006.01) |
| *H04B 1/525* | (2015.01) |
| *H04B 1/12* | (2006.01) |
| *G01S 7/02* | (2006.01) |

(52) U.S. Cl.
CPC .............. *G01S 7/038* (2013.01); *H04B 1/123* (2013.01); *H04B 1/525* (2013.01)

(56) References Cited

U.S. PATENT DOCUMENTS

| | | | |
|---|---|---|---|
| 5,074,631 A | 12/1991 | Hamano et al. | |
| 5,287,212 A | 2/1994 | Cox et al. | |
| 5,303,079 A | 4/1994 | Gnauk et al. | |
| 5,369,381 A | 11/1994 | Gamand | |
| 5,389,782 A | 2/1995 | Hilliard | |
| 5,602,387 A | 2/1997 | Bowen | |
| 5,977,911 A | 11/1999 | Green et al. | |
| 6,028,695 A | 2/2000 | Uemura et al. | |
| 6,081,232 A | 6/2000 | Pittman et al. | |
| 6,137,442 A | 10/2000 | Roman et al. | |
| 6,175,672 B1 | 1/2001 | Newberg et al. | |
| 6,295,395 B1 | 9/2001 | Paek | |
| 6,310,706 B1 | 10/2001 | Heidemann et al. | |
| 6,320,539 B1 | 11/2001 | Matthews et al. | |
| 6,330,098 B1 | 12/2001 | Gopalakrishnan | |
| 6,337,660 B1 | 1/2002 | Esman et al. | |
| 6,393,177 B2 | 5/2002 | Paek | |
| 6,704,349 B1 * | 3/2004 | Masenten ............... | H04B 1/123 375/219 |
| 8,249,536 B2 * | 8/2012 | Jung ...................... | H04B 1/525 455/222 |
| 8,400,234 B2 * | 3/2013 | Yang ...................... | H04B 1/525 333/109 |
| 8,462,836 B2 * | 6/2013 | Choi ...................... | H04B 1/525 375/224 |
| 8,463,201 B2 * | 6/2013 | Jung ...................... | H04B 1/525 455/114.2 |
| 8,537,881 B2 * | 9/2013 | Choi ...................... | H04B 1/525 370/278 |
| 2002/0012500 A1 | 1/2002 | Paek | |
| 2002/0032004 A1 | 3/2002 | Widrow | |
| 2002/0106141 A1 | 8/2002 | Gopalakrishnan | |
| 2003/0090769 A1 | 5/2003 | Lagasse | |
| 2003/0147581 A1 | 8/2003 | Doi et al. | |
| 2004/0114542 A1 | 6/2004 | Stopler | |
| 2004/0151238 A1 | 8/2004 | Masenten | |
| 2005/0069327 A1 | 3/2005 | Franck et al. | |
| 2007/0152871 A1 | 7/2007 | Puglia | |
| 2007/0189778 A1 | 8/2007 | Burns et al. | |
| 2007/0194886 A1 | 8/2007 | Bang et al. | |
| 2007/0206961 A1 | 9/2007 | Iannelli | |
| 2008/0175593 A1 | 7/2008 | Guifang | |
| 2008/0198773 A1 | 8/2008 | Loh | |
| 2009/0130981 A1 | 5/2009 | Nagai et al. | |
| 2009/0206908 A1 | 8/2009 | Lee et al. | |
| 2009/0296790 A1 | 12/2009 | Cheung et al. | |
| 2010/0029350 A1 | 2/2010 | Zhang | |
| 2010/0048146 A1 * | 2/2010 | McCallister ........... | H04B 1/525 455/78 |
| 2011/0053525 A1 | 3/2011 | Yi | |

FOREIGN PATENT DOCUMENTS

| | | |
|---|---|---|
| CN | 102006102 A | 4/2011 |
| EP | 0282293 A2 | 9/1988 |
| EP | 0916968 A2 | 5/1999 |
| EP | 1 508 975 A1 | 2/2005 |
| EP | 2 030 328 A0 | 3/2009 |
| EP | 1649539 | 1/2011 |
| FR | 2796766 A1 | 1/2001 |
| JP | 57197934 | 12/1982 |
| JP | 02-094820 | 4/1990 |
| JP | 08-79126 | 3/1996 |
| JP | 8-79126 | 3/1996 |
| JP | 08-079126 | 3/1996 |
| JP | 09008737 | 1/1997 |
| JP | 11-308143 | 5/1999 |
| JP | 2003-530685 | 10/2003 |
| JP | 2004-363862 | 12/2004 |
| JP | 2009-081719 | 4/2009 |
| JP | 2010-056876 | 3/2010 |
| JP | 4478680 | 3/2010 |
| JP | 2010-522451 | 7/2010 |
| JP | 5328680 | 8/2013 |
| JP | 2004-363862 | 1/2015 |
| KR | 10-0966222 | 6/2010 |
| KR | 10-1222726 | 1/2013 |
| WO | 2005008832 A2 | 1/2005 |
| WO | 2007/149954 A1 | 12/2007 |

OTHER PUBLICATIONS

"Final Office Action" For U.S. Appl. No. 14/417,122, dated Apr. 21, 2017, 24 pages, the USPTO, US.
"Amendment and Response" for U.S. Appl. No. 14/417,122, filed Feb. 9, 2017, 24 pages.
Ghose, Rabindra, N., Interference Mitigation, 1996, pp. 39-45, IEEE Electromagnetic Compatibility Society, IEEE Press, Institute of Electrical and Electronics Engineers, New York.
"Rejection Decision" for Chinese Patent Application No. 201380040249. 9, dated Nov. 3, 2017, 4 pages, State Intellectual Property Office of the People's Republic of China, China.
"Rejection Decision" for Korean Patent Application No. 10-2015-7002745, dated Nov. 29, 2017, 3 pages, Korean Intellectual Property Office, Korea.
"Notification Concerning Transmittal of Copy of International Preliminary Report on Patentability (Chapter I of the Patent Cooperation Treaty)", for PCT/US2013/052649, dated Feb. 12, 2015, 6 pages, The International Bureau of WIPO, Geneva, Switzerland.
Choi, et al., Achieving Single Channel, Full Duplex Wireless Communication, 2010, 12 pages, Stanford University.
Day, et al., Full-Duplex Bidirectional MIMO: Achievable Rates Under Limited Dyanmic Range IEEE, Jul. 2012.
Notification of Transmittal of the International Search Report and the Written Opinion of the International Searching Authority, or the Declaration for PCT/US2014/050343, dated Oct. 30, 2014, 9 pages, International Searching Authority, Korean Intellectual Property Office, Seo-gu, Daejeon, Republic of Korea.
Cox, et al., Demostration of a Single-Aperture, Full-Duplex Communication System, IEEE, Jan. 2013.
Cox, et al., Photonics for Simultaneous Transmit and Receive, IEEE MTT-S International Microwave Symposium Digest, Jun. 20, 201t.
"Office Action" for Japanese Patent Application No. 2015-525503, dated Jun. 26, 2015, 5 pages, Japanese Patent Office, Japan.
"Office Action" for U.S. Appl. No. 14/417,122, dated Aug. 16, 2016, 62 pages, USPTO.
Duarte, Experiment-Driven Characterization of Full Duplex Wireless Systems, Aug. 4, 2011, 68 pages, Rice University.
Choi, et al., Achieving Single Channel, Full Duplex Wireless Communication, 12 pages, Stanford University.
Wegener, et al., Simultaneous Transmit and Receive With a Small Planar Array, 3 pages, Purdue University.
"Office Action" for U.S. Appl. No. 10/710,463, dated Apr. 9, 2008, 7 pages, The USPTO, US.

(56) References Cited

OTHER PUBLICATIONS

"Notification Concerning Transmittal of Copy of International Preliminary Report on Patentability (Chapter I of the Patent Cooperation Treaty)", for PCT/US2011/037136, dated Dec. 6, 2012, 7 pages, International Bureau of WIPO, Geneva, Switzerland.
"Notification of Transmittal of the International Search Report and the Written Opinion of the International Searching Authority, or the Declaration" for PCT/US2011/37136, dated Oct. 25, 2011, 11 pages, International Searching Authority, Korean Intellectual Property Office, Seo-gu, Daejeon, Republic of Korea.
"Notification Concerning Transmittal of Copy of International Preliminary Report on Patentability (Chapter I of the Patent Cooperation Treaty)", for PCT/US2009/041058, dated Nov. 4, 2010, 6 pages, The International Bureau of WIPO, Geneva, Switzerland.
Ackerman, et al., the Effect of a Mach-Zehnder Modulator's Travelling Wave Electrode Loss on a Photonic Link's Noise Figure, Photonic Systems, Inc., Burlington, MA, US.
Anderson, Is a Broadband Low Noise Photonic Link an Oxymoron?, Lockheed Martin Advanced Technology Center, Palo Alto, CA, US.
Wenzel, Low Frequency Circulator/Isolator Uses no Ferrite or Magnet, RF Design Awards.
"Notification of Transmittal of the International Search Report and the Written Opinion of the International Searching Authority, or the Declaration" for PCT/US08/003297, dated Jul. 4, 2008, 11 pages, The International Searching Authority/EPO, Rijswijk, The Netherlands.
"Notification Concerning Transmittal of Copy of International Preliminary Report on Patentability (Chapter I of the Patent Cooperation Treaty)", for PCT/US2008/003297, dated Oct. 1, 2009, 8 pages, The International Bureau of WIPO, Geneva, Switzerland.
Notification of Transmittal of the International Search Report and the Written Opinion of the International Searching Authority, or the Declaration for PCT/US2009/041058, dated Nov. 30, 2009, 11 pages, International Searching Authority, Korean Intellectual Property Office, Seo-gu, Daejeon, Republic of Korea.
"Office Action" for U.S. Appl. No. 11/353,701, dated Jul. 25, 2008, 6 pages, The USPTO, US.
Cox et al., Photonics for Simultaneous Transmit and Receive, IEEE MTT-S International Microwave Symposium Digest, Jun. 20, 2011.
Notification of Transmittal of the International Search Report and the Written Opinion of the International Searching Authority, or the Declaration for Written Opinion of the International Searching Authority, for PCT/US2013/052649, dated Oct. 18, 2013, 9 pages, Korean Intellectual Property Office, Daejeon, Republic of Korea.
"Office Action" for U.S. Appl. No. 12/785,437, dated Mar. 11, 2013, 25 pages, The USPTO, US.
"Office Action" for U.S. Appl. No. 12/785,437, dated Jul. 17, 2012, 27 pages, The USPTO, US.
"Response to Office Action" for U.S. Appl. No. 12/785,437, filed Jan. 16, 2013, 15 pages.
"Office Action" for U.S. Appl. No. 14/417,122, dated Aug. 16, 2016, 62 pages, The USPTO.
"Response to Office Action" for U.S. Appl. No. 14/417,122, filed Feb. 9, 2017, 24 pages.
"Office Action" for U.S. Appl. No. 14/417,122, dated Apr. 21, 2017, 44 pages, The USPTO.
"Response to Office Action" for U.S. Appl. No. 14/417,122, filed Oct. 13, 2017, 31 pages.
"Office Action" for U.S. Appl. No. 14/417,122, dated Dec. 29, 2017, 45 pages, The USPTO.
"Response to Office Action" for U.S. Appl. No. 14/417,122, filed Jun. 28, 2018, 27 pages.
"Office Action" for U.S. Appl. No. 14/417,122, dated Sep. 7, 2018, 27 pages, The USPTO.
"Office Action" for Korean Patent Application No. 10-2015-7002745, dated Mar. 14, 2016, 4 pages, Korean Intellectual Property Office, South Korea.
"Notice of Allowance" for Korean Patent Application No. 10-2018-7018704, dated May 20, 2019, 2 pages, The Korean Intellectual Property Office.
"Office Action" for Chinese Application No. 201380040249.9, dated Oct. 27, 2015, 7 pages, State Intellectual Property Office of The People's Republic of China, Beijing, China.
Office Action for Korean Patent Application No. 10-2015-7002745, dated Jan. 26, 2017, 5 pages, Korean Intellectual Property Office, South Korea.
"Office Action" for Chinese Patent Application No. 201380040249.9, dated Aug. 23, 2016, 9 pages, State Intellectual Property of The People's Republic of China, Beijing, China.
Notice of Preliminary Rejection for Patent Application No. 10-2018-7018704, dated Oct. 18, 2018, 2 Pages, Korean Intellectual Property Office, Daejeon, Republic of Korea.
"Search Report" for European Patent Application No. 18202965.2, dated Jan. 17, 2019, 13 pages, European Patent Dffice, Munich, Germany.
McGregor, et al. Switching System for Single Antenna Operation of an S-band FMCW Radar, IEE Proceedings: Radar, Sonar, Navigation, Aug. 1994, vol. 141, No. 4, pp. 241-248.
"Notice of Allowance" for Chinese Patent Application No. 201380040249.9, dated Apr. 20, 2018, 2 pages, State Intellectual Property Office of the Peoples Republic of China, Beijing, China.
"Notice of Allowance" for Korean Patent Application No. 10-2015-7002745, dated Mar. 28, 2018, 2 pages, Korean Intellectual Property, Korea.
"Office Action" for Chinese Patent Application No. 201380040249.9, dated Apr. 19, 2017, 8 pages, State Intellectual Propert Office of The People's Republic of China, Beijing.
"European Search Report" for European Patent Application No. 13825058.4, dated Mar. 4, 2016, 10 pages, European Patent Office, Munich, Germany.
Duarte, et al. Full-Duplex Wireless Communications Using Off-The Shelf Radios: Feasibility and First Results, Proc. Asilomar Conf. Signals Syst, 2010, 1558-1562 pages.
Sahai, et al. Pushing the Limits of Full-Duplex: Design and Real-time Implementation, 2011, arXiv:1107.0607, 12 pages.
Jain, et al. Practical, Real-time, Full Duplex Wireless, Proc. ACM MobiCom'11, Sep. 2011, pp. 301-312.
"Notice of Preliminary Rejection" for Korean Patent Application No. 10-2019-7024482, dated Nov. 19, 2019, 5 pages, Korean Intellectual Property Office, South Korea.
"Notification of the First Office Action" for Chinese Patent Application No. 201810726981.6, dated Dec. 30, 2019, 7 pages, China National Intellectual Property Administration, Beijing, China.

* cited by examiner

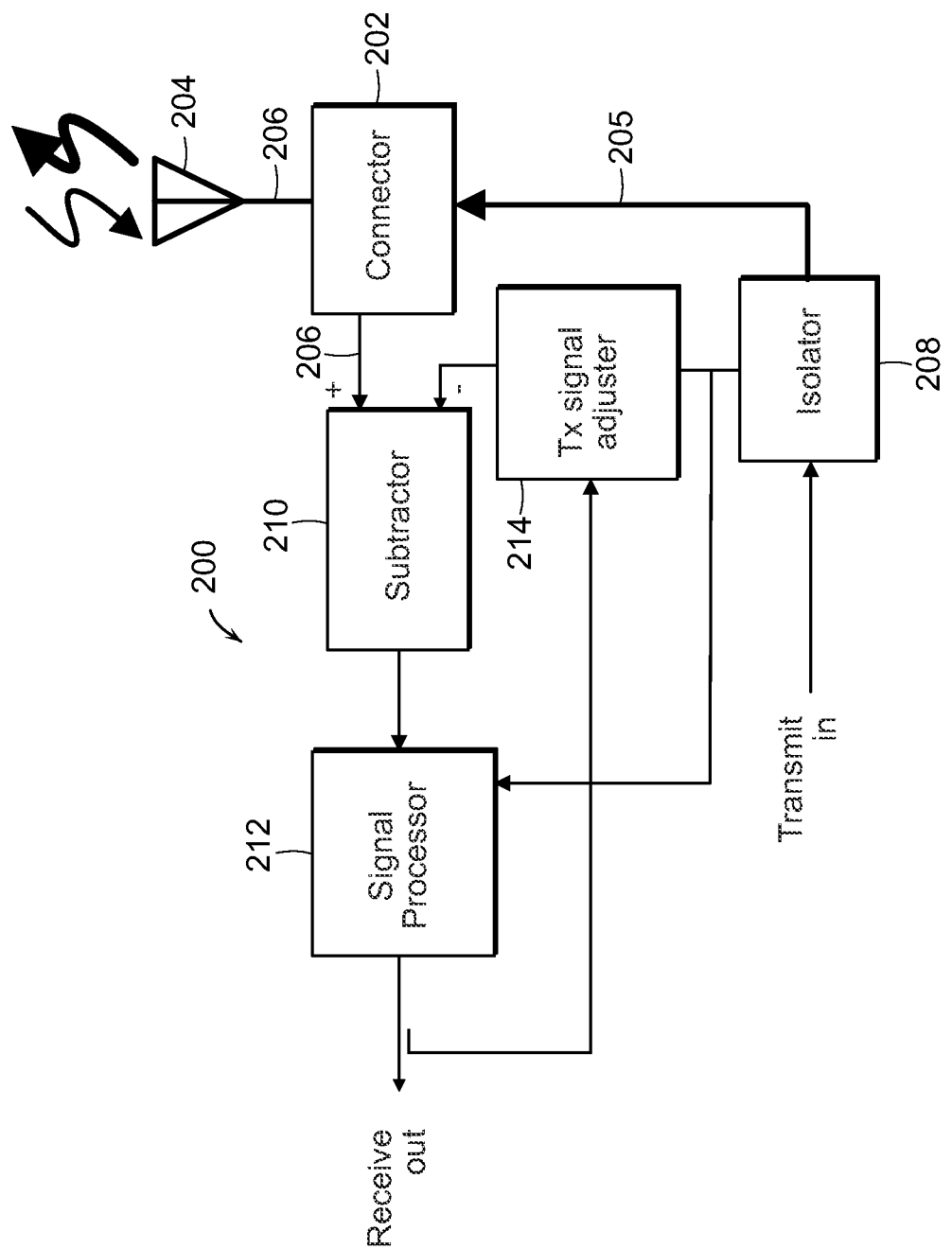

High impedance at output of transmit path

Fast switch

Active electronic – voltage

Active electronic – current

Passive electronic

Photonic

Non-reciprocal electronic

Photonic

Digital w/o frequency conversion (e.g. at RF)

Digital w frequency conversion (e.g. at IF or baseband)

ent teaching.
SAME-APERTURE ANY-FREQUENCY SIMULTANEOUS TRANSMIT AND RECEIVE COMMUNICATION SYSTEM

CROSS REFERENCE TO RELATED APPLICATION

This application is a continuation of U.S. patent application Ser. No. 15/901,729, entitled "Same-Aperture Any-Frequency Simultaneous Transmit and Receive Communication System", filed Feb. 21, 2018, which is a continuation of U.S. patent application Ser. No. 13/844,180, entitled "Same-Aperture Any-Frequency Simultaneous Transmit and Receive Communication System", filed on Mar. 15, 2013, now U.S. Pat. No. 9,935,680, which claims priority to U.S. Provisional Patent Application No. 61/755,044, filed on Jan. 22, 2013, entitled "Single-Aperture, Full Duplex Communication System" and to U.S. Provisional Patent Application No. 61/677,366 filed on Jul. 30, 2012, entitled "Signal Canceller and Simultaneous Transmit and Receive System with Signal Processing." The entire contents of U.S. patent application Ser. No. 15/901,729, U.S. Pat. No. 9,935,680, and U.S. Provisional Patent Application Ser. Nos. 61/755,044 and 61/677,366 are herein incorporated by reference.

The section headings used herein are for organizational purposes only and should not to be construed as limiting the subject matter described in the present application in any way.

INTRODUCTION

It is generally assumed in communications that it is not possible to simultaneously transmit and receive (STAR) in the same frequency band. Recently this basic tenet has begun to be challenged by several groups that have reported prototype STAR systems. Researchers at Purdue in, for example, A. Wegener and W. Chappell, "Simultaneous transmit and receive with a small planar array," IEEE MTT-S Int. Microwave Symp. Dig., Montreal, June 2012, and researchers at Stanford in, for example, J. Choi, et al., "Achieving Single Channel, Full Duplex Wireless Communication," Proc. Int. Conf. Mobile Computing and Networking, New York, 2010 have proposed arrangements of multiple antenna elements in which the receive antenna is located in a null of the transmit antenna pattern to realize ~40 dB of transmit-to-receive (T/R) isolation.

Signal processing was then used to extend the T/R isolation to ~60-70 dB. A group at Rice University using single, separate transmit and receive antennas, computed the required cancelling signal and used it to cancel the transmit signal before it reached the analog-to-digital converter. See A. Sahai, B. Patel and A. Sabharwal, "Asynchronous full-duplex wireless," Proc. Int. Conf. on Communication Systems and Networks, pp. 1-9, 2012. This group reported up to 79 dB suppression. A key limitation of these approaches is the limited bandwidth over which sufficient T/R isolation can be achieved.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

FIG. 2 shows a block diagram of a same-aperture any-frequency STAR system according to the present teaching.

DESCRIPTION OF VARIOUS EMBODIMENTS

Figure 1:
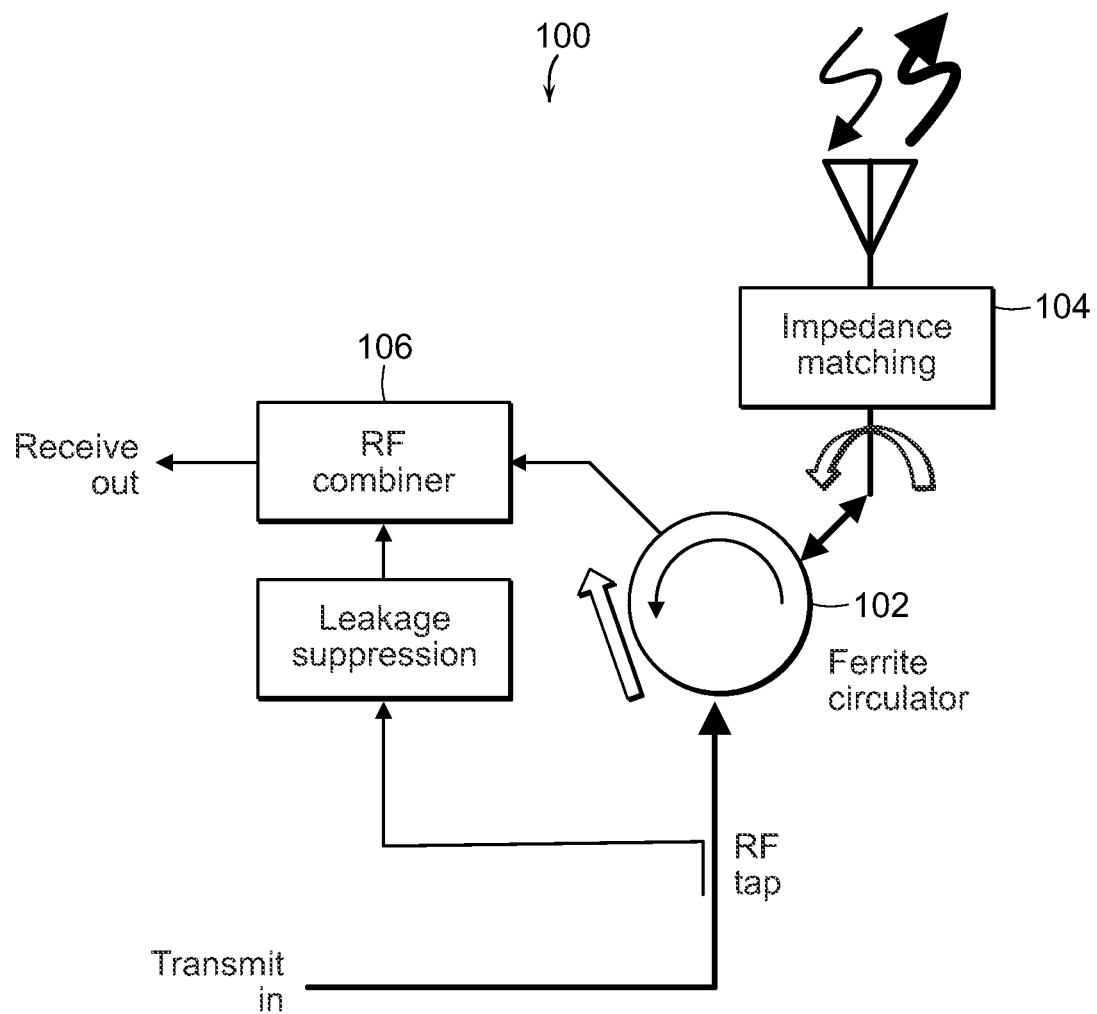
FIG. 1 illustrates a block diagram of a same-aperture any-frequency simultaneously transmit and receive (STAR) system using known technology.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings may be performed in any order and/or simultaneously as long as the teaching remains operable. Furthermore, it should be understood that the apparatus and methods of the present teachings can include any number or all of the described embodiments as long as the teaching remains operable.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

For decades, there existed only microwave circulators to simultaneously connect the transmit and receive paths to a common antenna. Microwave circulators are passive components with three ports arranged in a waveguide ring around a ferrite disk that induces a direction-dependent phase shift, causing the two counter-circulating halves of the wave to add up constructively at the next port in one circumferential direction along the ring but destructively at the next port in the other direction. A ferrite circulator is an inherently narrow-band device because it depends on summing and differencing the RF phase of two waves. Designers have found ways to widen a ferrite circulator's bandwidth in exchange for some loss of its perfect unidirectionality at its center design frequency. Ferrite circulators are now commercially available from multiple vendors with ~20 dB of port 1-3 isolation over an octave-wide band.

To enable single-aperture STAR applications, separate groups of researchers recently hit upon two active circulator designs. An electronic circulator has achieved up to 40 dB T/R isolation, albeit over only about 10% bandwidth at X-band. A description of the electronic circulator's principle of operation is described in S. Cheung, et al., "MMIC-based quadrature hybrid quasi-circulators for simultaneous transmit and receive," IEEE Trans. Microwave Theory Tech., vol. 58, pp. 489-497, March 2010.

The second new type of device is based on photonics and hence it is referred to herein as a photonic circulator. As described herein, this new photonic component performs two additional functions beyond those of a conventional ferrite circulator. For this reason, we refer to the new photonic component as a TIPRx, for Transmit-Isolating Photonic Receiver.

Several years ago Photonic Systems, Inc., the assignee of the present application, began to investigate a more challenging yet potentially more widely applicable STAR configuration, which is STAR via the same antenna element and in the same polarization.

It is well known in the communications art that to simultaneously transmit and receive via the same aperture, one must use either time, frequency, or code multiplexing. Time multiplexing involves inserting a switch so that either the transmitter or the receiver is connected to the antenna. Frequency multiplexing involves inserting a diplexer and/or filters so that the transmit and the receive signals occupy disjoint portions of the RF spectrum. Code multiplexing uses orthogonal codes for the transmit and receive signals; the relatively limited degree of orthogonality that can be realized, however, often requires code multiplexing to be augmented with frequency multiplexing to achieve sufficient transmit-to-receive (T/R) isolation. Thus, persons skilled in the art generally agree that it is not possible to simultaneously transmit and receive via the same aperture using the same portion of the RF spectrum at the same time.

FIG. 1 illustrates a block diagram of a same-aperture any-frequency simultaneously transmit and receive (STAR) system 100 using known technology. The isolation is provided by the ferrite circulator 102. An impedance matching network 104 is connected to one port of the circulator 102 that receives the reception signal. The transmit signal is applied to the second port of the circulator 102. A 2-way RF combiner 106 is used to combine the receive signal that includes a portion of the transmit signal with a leakage suppression signal.

A key parameter to achieving same-aperture any-frequency STAR is the T/R isolation; systems typically would require >60 dB of T/R isolation. The system 100 of FIG. 1 shows the two main paths by which the strong transmit signal can enter the receive path. One path is leakage through the circulator 102. Typical T/R isolation of a ferrite circulator is in the range 15-20 dB. It is well known that one can improve the isolation of a circulator by constructing a second path and designing this second path so that the transmit signal in this path destructively interferes with the circulator leakage. However, the bandwidth over which this isolation improvement can be achieved is severely limited. The other primary path by which the transmit signal can enter the receive path is through reflection off the antenna impedance. The return loss of state-of-the-art antennas is also in the range of −15 to −20 dB. One approach to improve the antenna return loss is to use an impedance matching circuit. It can be shown, however, that the required degree of improvement in impedance match is beyond that which is physically realizable, which is set by the Bode-Fano limit. One aspect of the present teaching relates to methods and apparatus for improving the T/R isolation in same-aperture any-frequency STAR systems over a sufficiently wide bandwidth for practical systems.

FIG. 2 shows a block diagram of a same-aperture any-frequency STAR system 200 according to the present teaching. The system 200 includes a three-port signal connector 202 that passes both transmit and receive signals. The signal connector 202 connects three signal paths, one from and to the antenna 204, one from the output of transmit path 205 and one to the input to receive path 206. In practical systems, the relative impedance seen by signals propagating in these paths is important. A signal isolator 208 is present in the transmit signal path 205. A signal differencing device or equivalently a signal subtractor 210 connects the signal isolator 208 and the signal connector 202. The system also includes various optional feedback components to improve the T/R isolation.

One input of the differencing device 210 is connected to the receive path 206. Another input of the differencing device 210 is connected to the transmit signal path 205 that ideally has no residual receive signal. The isolator 208 connected to the transmit signal path 205 is designed to isolate any residual receive signal so that a clean copy of the transmit signal is applied to the differencing device 210. In operation, the differencing device 210 subtracts out the large transmit signal leaving just the receive signal.

If the transmit signal environment is sufficiently stable, it is possible to provide a transmit signal of fixed complex value to the second port of the differencing device 210. However, in many practical same-aperture any-frequency STAR systems, the transmit environment around the antenna 204 will change as a function of time, which in turn will cause the complex value of the transmit signal reflected by the antenna to change. In these situations it is desirable to include a signal processor 212 to determine the precise complex value of the transmit signal that should be fed to the second terminal of the differencing device 210 so as to minimize the residual transmit signal that is present in the receive path. A transmit signal adjustment circuit 214 is used to set the complex value of the transmit signal.

Figure 3A:
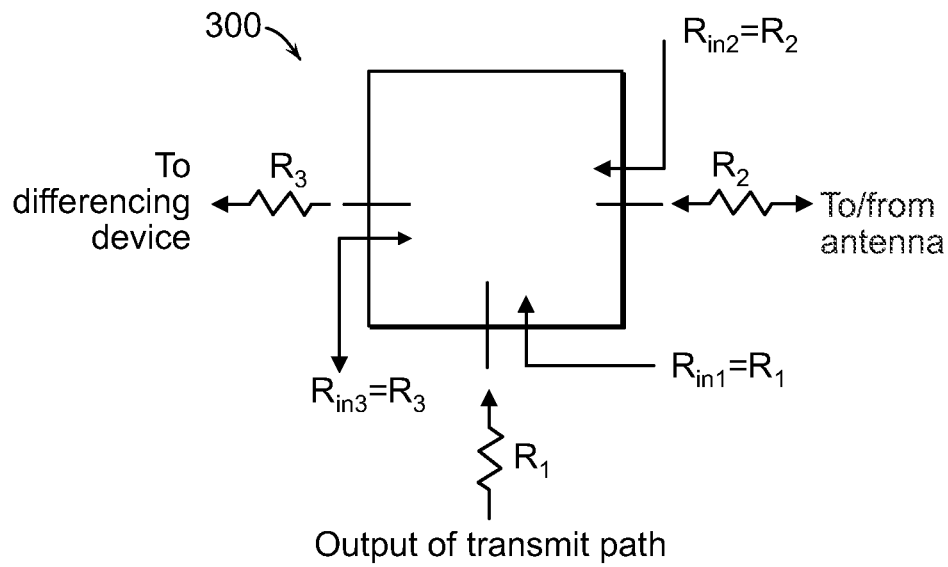
FIG. 3A illustrates a signal connector in which the RF impedance is matched at each of the three ports.

FIGS. 3A-3D illustrate four different signal connectors that can be used with same-aperture any-frequency STAR systems according to the present teaching. Referring to FIG. 2 and FIGS. 3A-3D, the impedance at each port of the signal connector can be designed to match the impedance of the component that is connected to that port. An impedance match at each port can be achieved in numerous ways known in the art. For example, lumped element resistive dividers, traveling wave resistive (Wilkinson) dividers, and 180 degree hybrid couplers can be used to impedance match the port. FIG. 3A illustrates a signal connection 300 where all three ports of the signal connector 300 are impedance-matched to the paths to which they are connected.

Figure 3B:
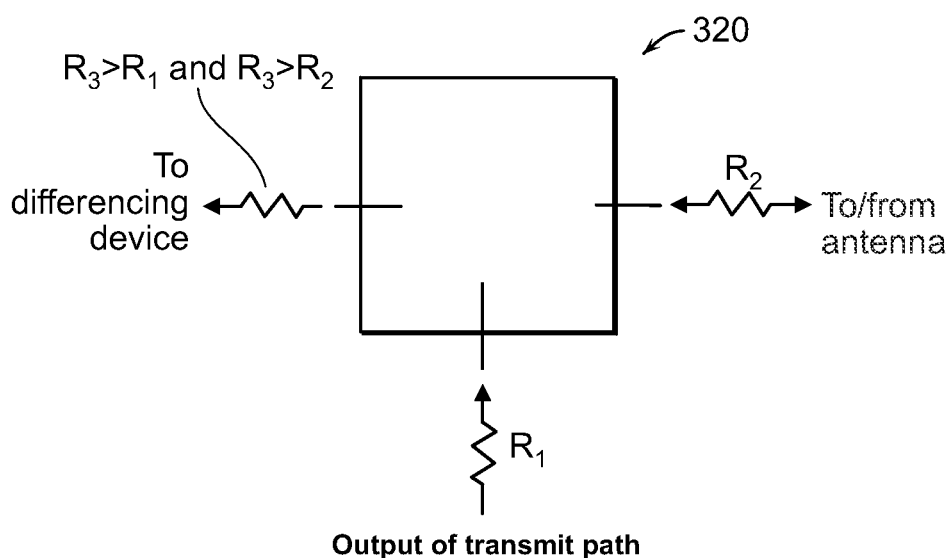
FIG. 3B illustrates a signal connector wherein the path to the differencing device presents a high RF impedance at the port labeled Port 3, which minimizes the signal loss in the connector between Port 1 and Port 2.

FIG. 3B illustrates a signal connector 320 that is presented with a high RF impedance at the input to the differencing device 210, and therefore $R_{diff} > R_{antenna}$ and $R_{diff} > R_{isolator}$. Hence, the antenna 204 impedance provides the primary load to the output of the transmit signal path 205, which means more of the transmit power is delivered to the antenna 204 than is delivered to the receive path 206, which is highly desirable for many applications.

Figure 3C:
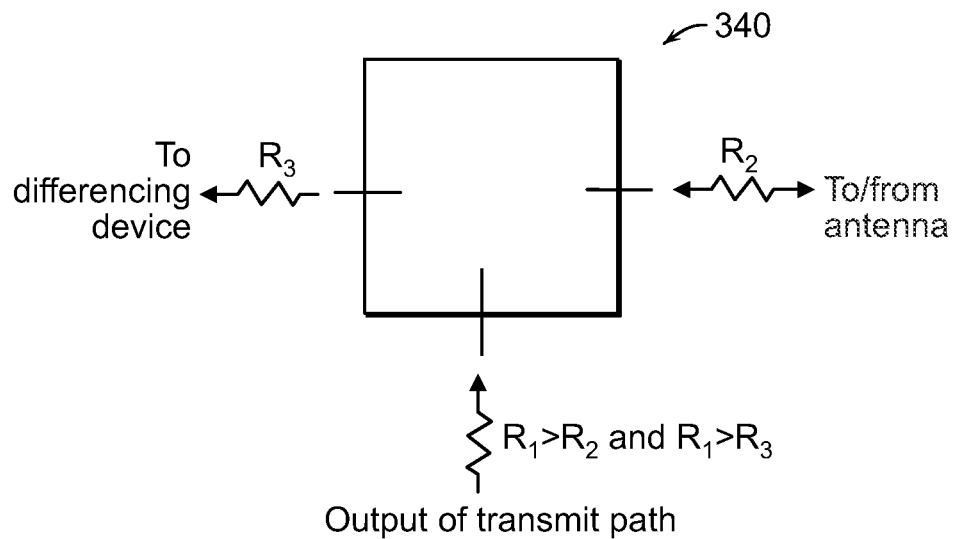
FIG. 3C illustrates a signal connector wherein the output of the transmit signal path presents a high RF impedance at the port labeled Port 1, which minimizes the signal loss in the connector between Port 2 and Port 3.

FIG. 3C illustrates a signal connector 340 that is presented with a high RF impedance at the output of the transmit signal path 205, so that $R_{isolator} > R_{diff}$ and $R_{isolator} > R_{antenna}$. In this signal connector 340, the transmit power is divided between the antenna 204 and the input to the differencing device 210 in proportion to the relative impedances of these two devices, represented by $R_{antenna}$ and $R_{diff}$ respectively. In the special sub-case where $R_{antenna} = R_{diff}$ the maximum receive power will be delivered to the input of the differencing device 210, which is often desired to achieve the maximum receiver sensitivity.

Figure 3D:
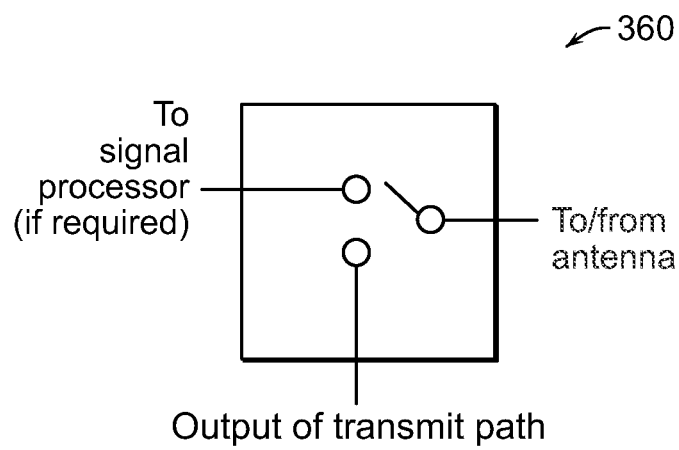
FIG. 3D illustrates a signal connector including a fast switch.

FIG. 3D illustrates a signal connector 360 including a fast switch. Using the fast switch can eliminate several of the system components. In some embodiments, the fast switch signal connector 360 eliminates the need for the differencing device 210 and isolator 208. The use of the fast switch can also eliminate the need for the signal processor 212 and transmit signal adjustment circuit 214.

FIGS. 4A-4D illustrate four different differencing devices 210 (FIG. 2). Referring to FIGS. 2-4, FIGS. 4A and 4B illustrate an active electronic differencing device 400, 420 that takes the difference of two voltages and two currents. One example of such active differencing devices 400, 420 is differential or balanced amplifiers. The active differencing devices 400, 420 typically provide gain, which is well known to be advantageous if it is desired to achieve a low noise figure for the receive signal. The active differencing devices 400, 420 can be realized with a wide range of input impedances. For example, voltage differencing devices typically present a high impedance whereas current differencing devices typically present a low impedance. This range of input impedances for the active differencing devices 400, 420 permits the active differencing device 400, 420 to be used with the matched impedance connection 300 as described in connection with FIG. 3A, the high impedance receive path signal connector 320 described in connection with FIG. 3B, or the high impedance transmit signal connector 340 described in connection with FIG. 3C.

Figure 4A:
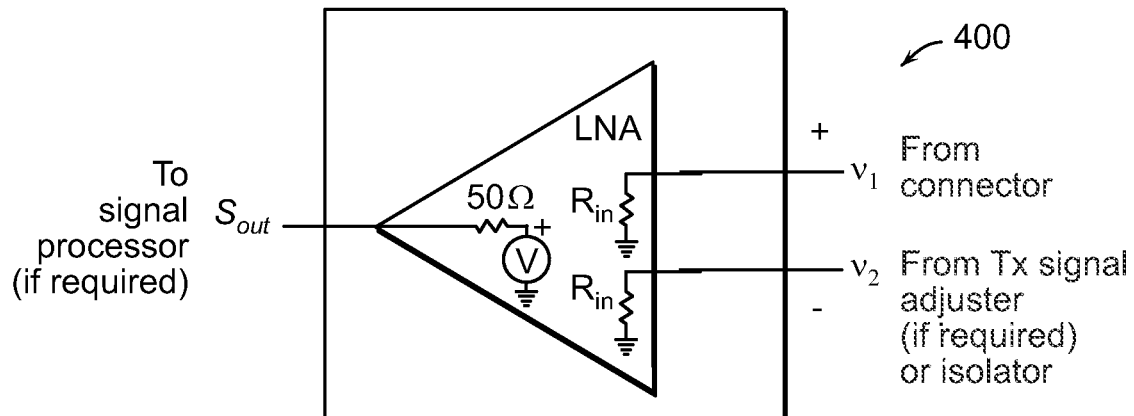
FIGS. 4A and 4B illustrate an active electronic differencing device that takes the difference of two voltages and two currents.
Figure 4B:
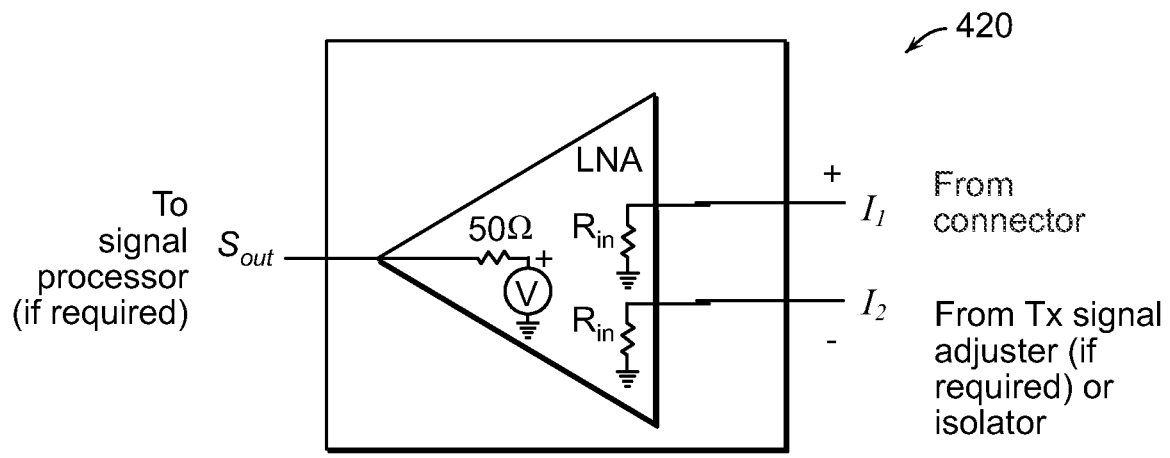
Figure 4C:
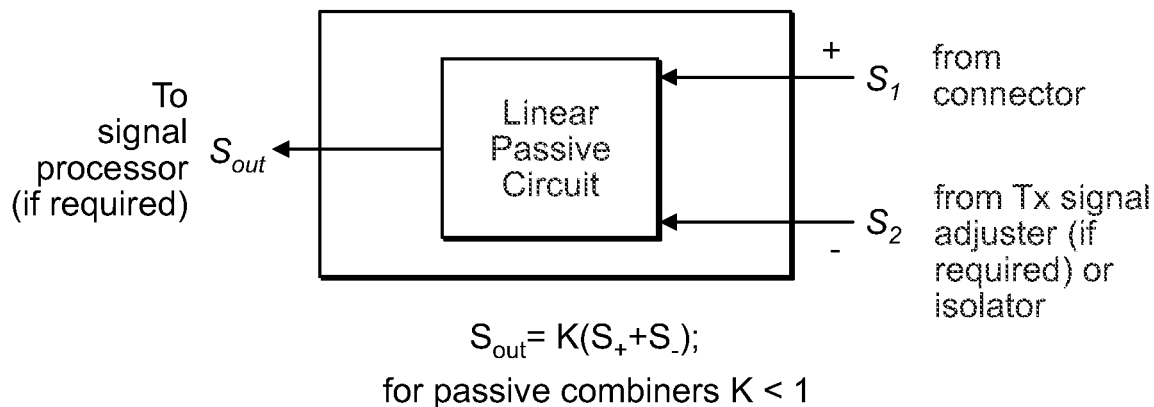
FIG. 4C illustrates a passive electronic differencing device.

FIG. 4C illustrates a passive electronic differencing device 440. Passive devices are limited to having a gain less than one, and thus all have some loss. Consequently, passive differencing devices 440 have higher noise figures than the active electronic differencing devices 400, 420 described in connection with FIGS. 4A and 4B. There are many ways to implement a passive electronic differencing device. For example, lumped element resistive dividers, traveling wave resistive (Wilkinson) dividers, and 180 degree hybrid couplers are all effective at implementing an electronic differencing device.

Active electronic differencing devices, such as the devices 400, 420 described in connection with FIGS. 4A and 4B, can be used to sum two signals. Differencing can be realized by offsetting the phase of the clean transmit signal by 180 degrees relative to the phase of the transmit signal that is applied to the antenna 204, which effectively applies the inverse of the transmit signal to the summing port. This equivalence between subtracting and adding the inverse is easily demonstrated by the equality: Rx−Tx=Rx+(−Tx). In some embodiments of the present teaching, the same physical hardware can realize both the matched signal connector described in connection with FIG. 3A 300 and the passive differencing device 440 which implements 180 degree phase reversal of the clean transmit signal where necessary as described in connection with FIG. 4C.

Figure 4D:
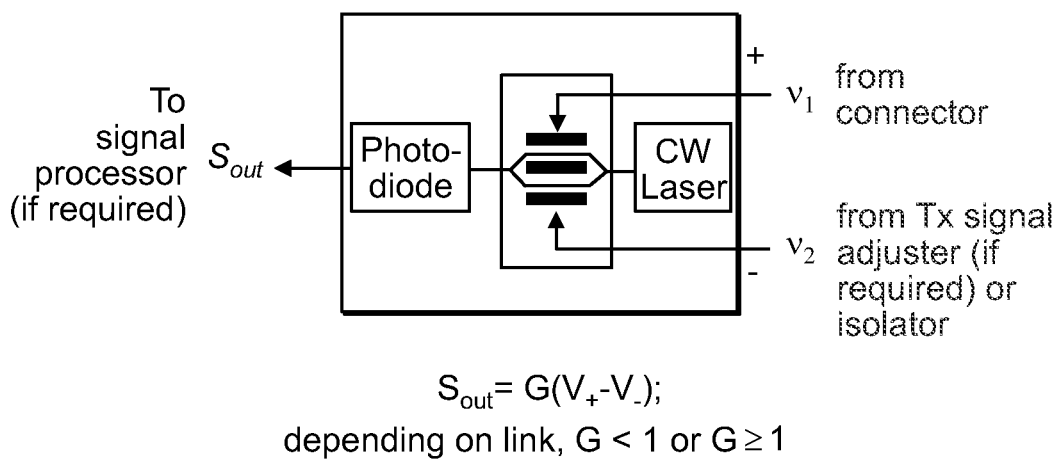
FIG. 4D illustrates one embodiment of a photonic differencing device that includes a balanced-drive optical modulator which produces a modulated output that is proportional to the sum or difference between the signals that are applied to the electrodes.

FIG. 4D illustrates one embodiment of a photonic differencing device 460 that includes a balanced-drive optical modulator which produces a modulated output that is proportional to the sum or difference between the signals that are applied to the electrodes. Such electrodes can be either high impedance or matched impedance so that the photonic differencing device can be used with the matched impedance signal connector 300 described in connection with FIG. 3A, the high impedance receive path signal connector 320 described in connection with FIG. 3B or the high impedance transmit signal connector 340 described in connection with FIG. 3C.

Furthermore, depending on the design of the particular photonic differencing device the photonic differencing device can have a gain that is greater or less than unity. Thus, the photonic differencing device can provide either gain or loss. When the photonic differencing device is designed to have gain, it is capable of achieving low noise figure, much like active electronic differencing devices. When the photonic differencing device is designed to have loss, it has higher noise figure, much like passive electronic differencing devices. Some types of differential optical modulators are only capable of summing two signals. In such cases, these differential modulators can realize the required differencing by offsetting the clean transmit signal by 180 degrees as described in connection with FIG. 4C.

There are two basic types of signal sources: voltage sources and current sources. An ideal voltage source is a signal source with zero internal impedance. An ideal current source is a signal source with infinite internal impedance. Such ideal signal sources are not realizable. Realizable voltage sources generally have an internal impedance that is much lower than the external impedances in the circuit. Realizable current sources generally have an internal impedance that is much larger than the external impedances in the circuit.

FIG. 5 illustrates various signal isolators that can be used with the same-aperture any-frequency STAR system of the present teaching. FIG. 5A illustrates an electronic voltage-source-based isolator 500. The isolator 500 in FIG. 5A shows one simple way that isolation can be achieved with a voltage source. A voltage source establishes a potential difference or voltage across its output terminals. The voltage across a voltage source is independent of an external signal that is applied to its output. Hence the current that is developed through a resistor connected in series with a voltage source will not change the output voltage of the voltage source. For same-aperture any-frequency STAR systems, the voltage source signal is the transmit signal and the externally applied signal would be the receive signal. Consequently, the output of the voltage source will contain a clean copy of the transmit signal, which is what is desired.

Figure 5A:
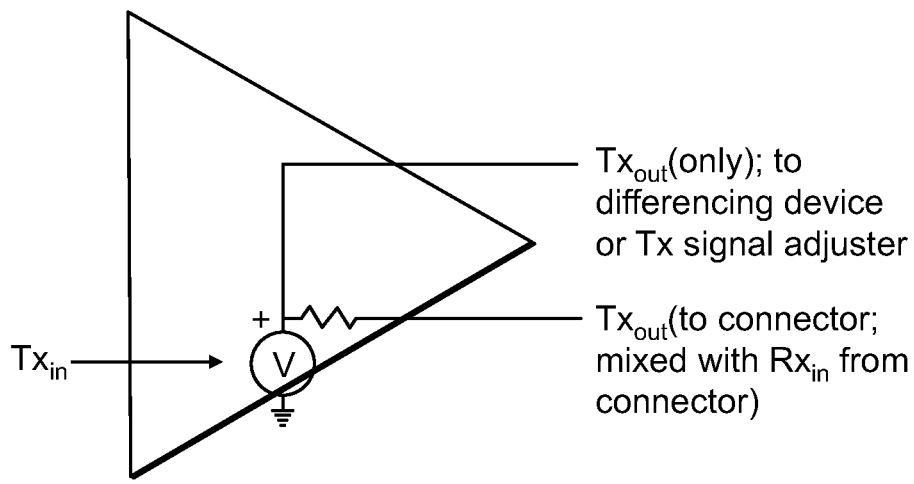
FIG. 5A illustrates an electronic voltage-source-based isolator that can be used with the same-aperture any-frequency STAR system of the present teaching.
Figure 5B:
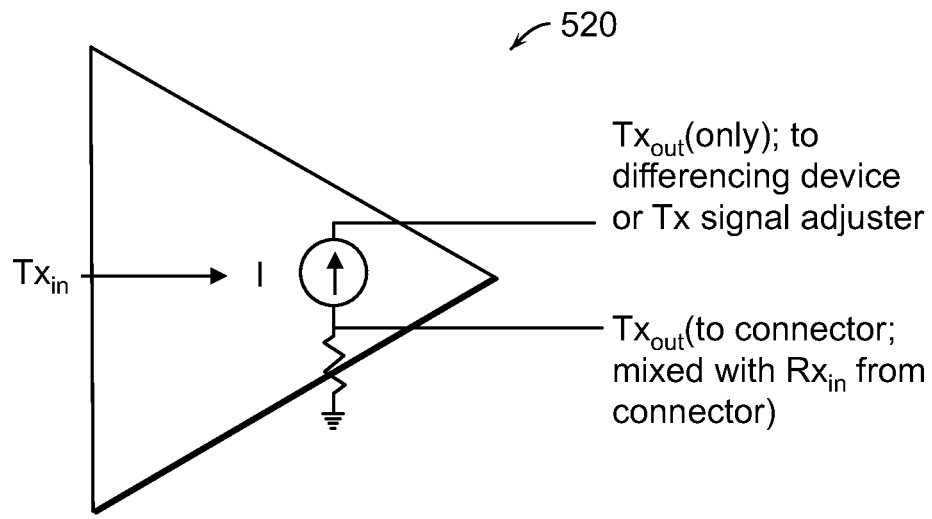
FIG. 5B illustrates a current-source-based signal isolator used with the same-aperture any-frequency STAR system of the present teaching.

FIG. 5B illustrates a current-source-based signal isolator 520 that can be used with the same-aperture any-frequency STAR system of the present teaching. Current sources establish a current that is independent of an external signal applied to its output. Hence, the voltage that develops across a resistor that is connected in series with a current source will only contain the current source signal and will not contain any signal that corresponds to the externally applied signal. For same-aperture any-frequency STAR systems, the current source signal is the transmit signal and the externally applied signal is the receive signal. Consequently, the voltage across the resistor will contain a clean copy of the transmit signal, which is what is desired.

Figure 5C:
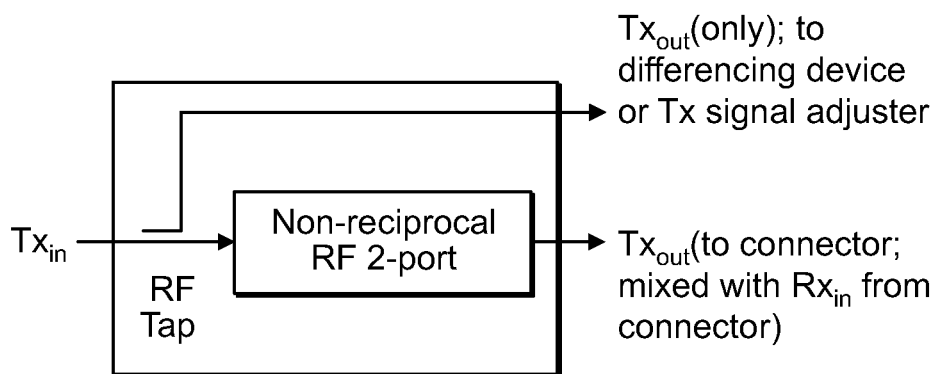
FIG. 5C illustrates a passive electronic isolator including a non-reciprocal RF two-port device that can be used with the same-aperture and frequency STAR system of the present teaching.

FIG. 5C illustrates a non-reciprocal RF isolator 540 that can be used with the apparatus of the present teaching. Examples of non-reciprocal RF isolators are ferrite isolators and gyrators. These devices have low transmission loss in one direction and high transmission loss in the other direction. For example, there can be low transmission loss from port 1 to port 2, but high transmission loss in the other direction, from port 2 to port 1.

Figure 5D:
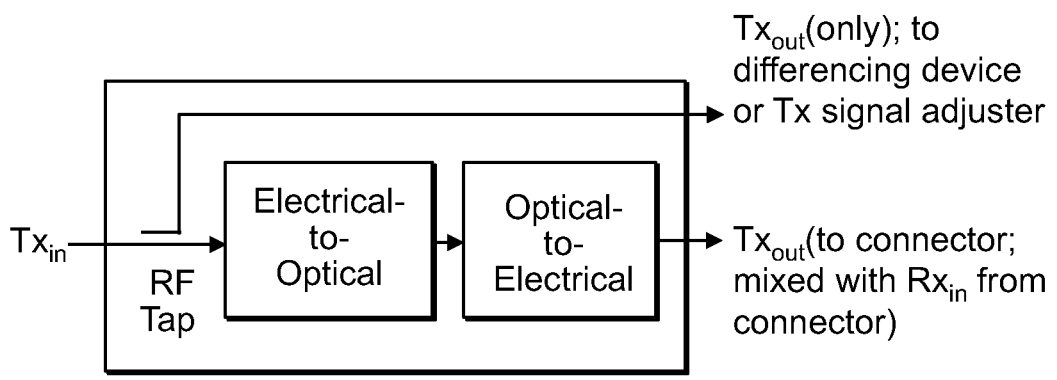
FIG. 5D illustrates a photonic isolator that can be used with the same-aperture any-frequency STAR system according to the present teaching.
Figure 6A:
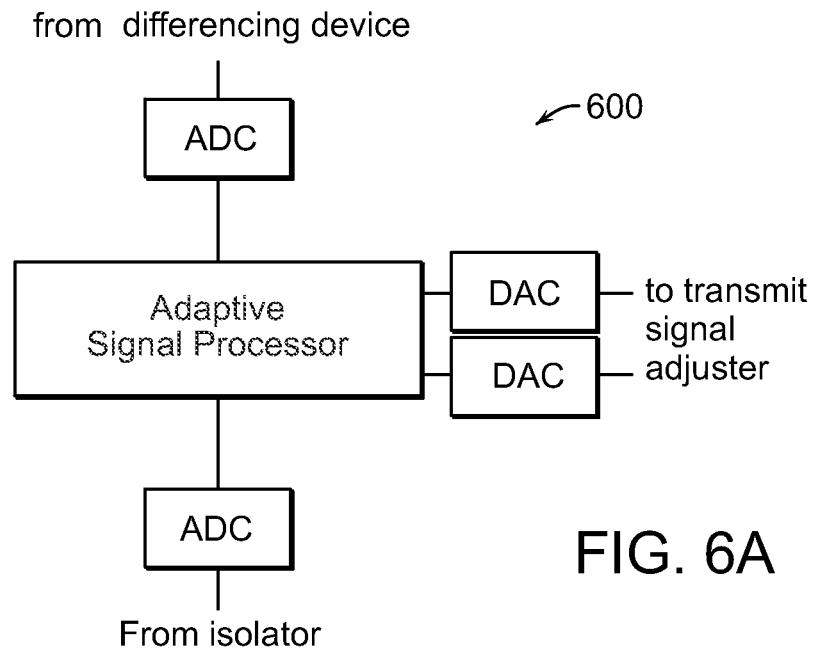
FIGS. 6A-6D illustrate signal processors that can be used with the same-aperture any-frequency STAR system according to the present teaching.
Figure 6B:
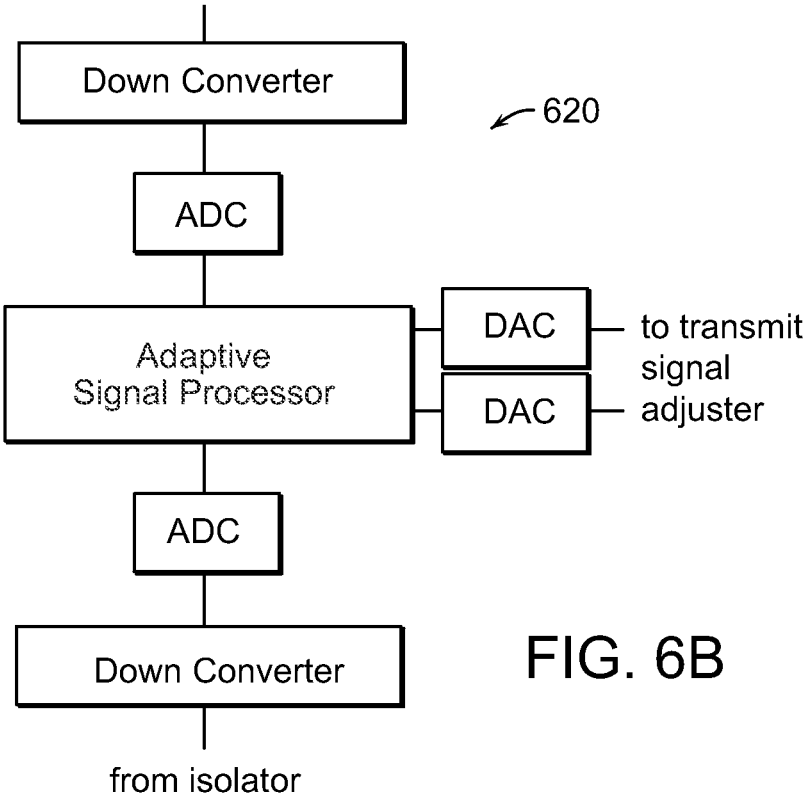
Figure 6C:
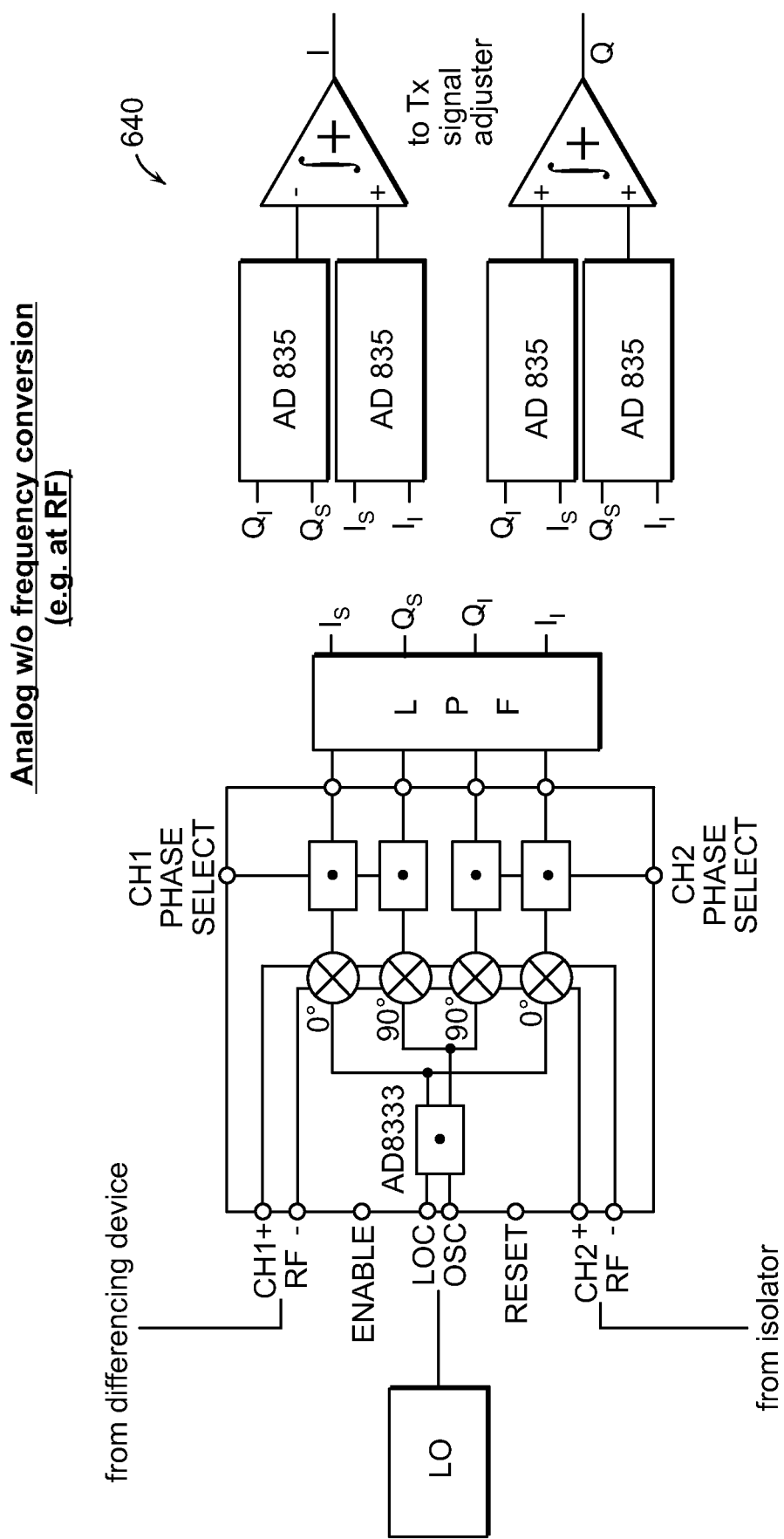
Figure 6D:
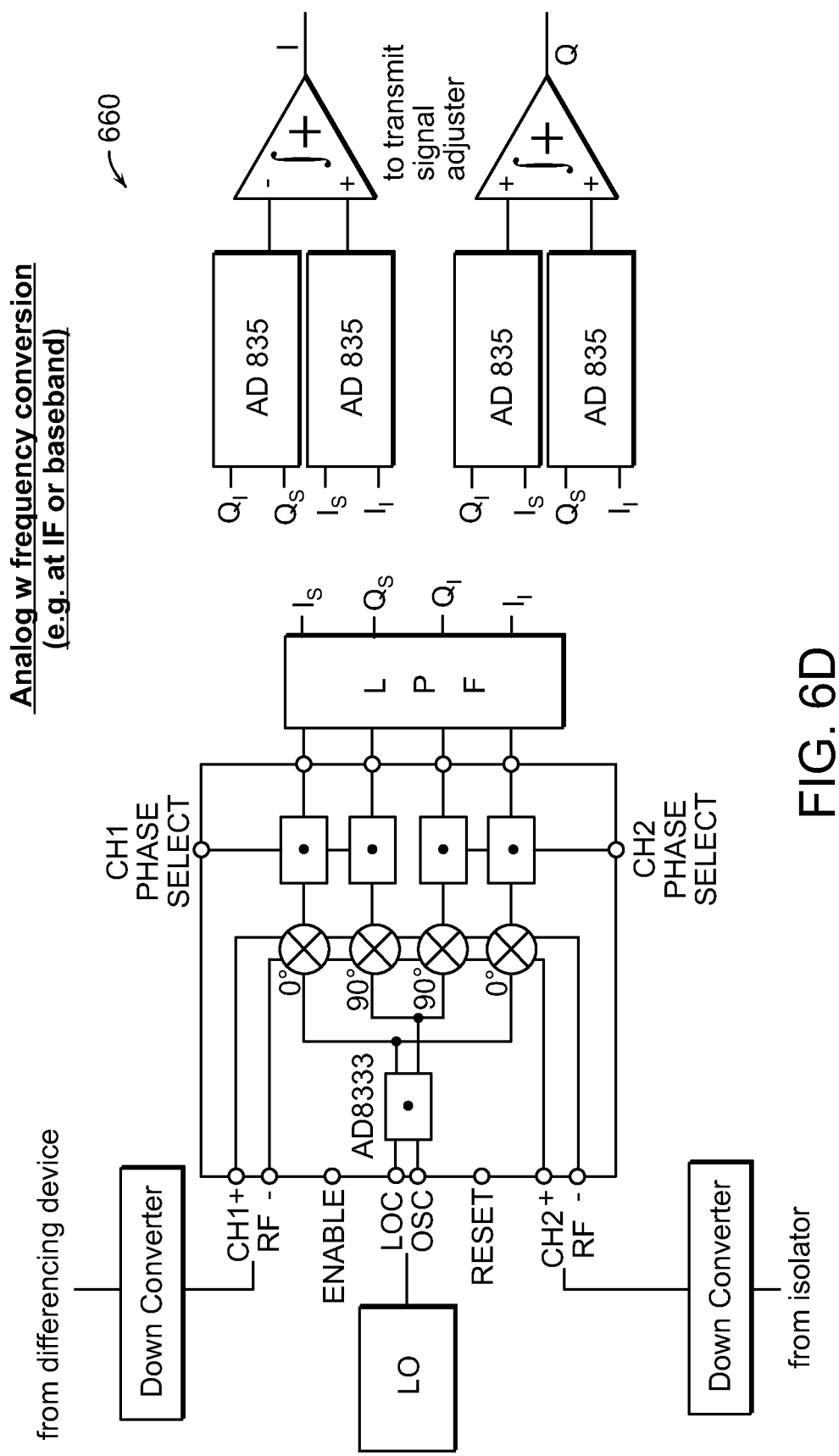

FIG. 5D illustrates a photonic isolator 560 that can be used with the same-aperture any-frequency STAR system according to the present teaching. Photonic isolators provide good coupling in the forward coupling direction and high isolation in the reverse direction. Good coupling in the forward direction is accomplished by an electrical-to-optical conversion device, such as a diode laser or an optical modulator, whose optical output is efficiently coupled to an optical-to-electrical conversion device, such as a photodetector. Photonic isolators provide extremely low coupling in the reverse direction because devices such as photodetector do not emit light, and the electrical-to-optical conversion device is not capable of detecting light.

FIGS. 6A-6D illustrate signal processors 600, 620, 640, and 660 that can be used with the same-aperture any-frequency STAR system according to the present teaching. Various types of digital and/or analog signal processors 600, 620, 640, and 660 can be used as shown in FIGS. 6A-6D. Referring to FIGS. 2 and 6, the signal processors 600, 620, 640, and 660 execute a wide range of algorithms, such as a least mean square algorithm, to perform various functions. The signal processing can be performed on the radio-frequency (RF) transmit signal, the RF receive signal, or at some lower intermediate-frequency (IF) signals. One such function is to correlate the clean copy of the transmit signal with the output of the differencing device 210, which contains both receive and transmit signals. The result of this correlation will be a residual transmit signal that is present in the output of the differencing device 210.

Another function performed by the signal processor 212 is estimating the complex value of the transmit signal that needs to be applied to the input of the differencing device 210 so as to result in minimizing the residual transmit signal at the output of the differencing device 210. The result of this estimation is a signal that is applied to the transmit signal adjustment circuit 214.

Figure 7B:
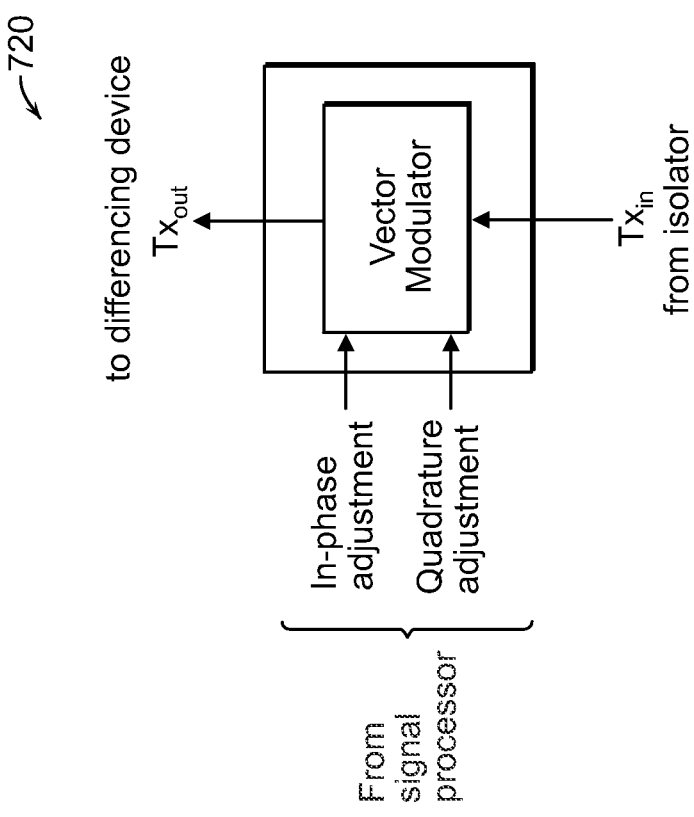
FIG. 7B shows an adjustment circuit that adjusts the in-phase and quadrature components of the transmit signal that can be used with the same-aperture any-frequency STAR system according to the present teaching.
Figure 7A:
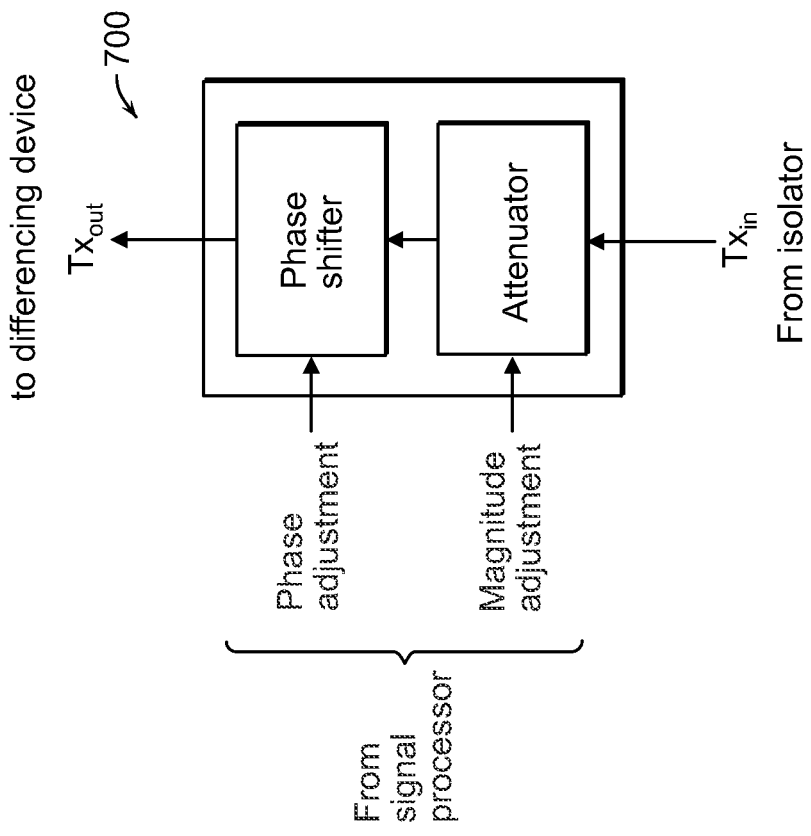
FIG. 7A shows an adjustment circuit that adjusts the magnitude and phase of the transmit signal that can be used with the same-aperture any-frequency STAR system according to the present teaching.

FIG. 7 illustrates transmit signal adjustment circuits 700, 720 that can be used with the same-aperture any-frequency STAR system according to the present teaching. The transmit signal adjustment circuits 700, 720 generate a signal that adjusts the complex value of the transmit signal. There are numerous types of signal adjustment circuits that can be used with the same-aperture any-frequency STAR system according to the present teaching, two of which are shown in FIGS. 7A and B. FIG. 7A illustrates an embodiment of an adjustment circuit 700 that adjusts the magnitude and phase of the transmit signal. FIG. 7B illustrates an embodiment of an adjustment circuit 720 that adjusts the in-phase in-quadrature components of the transmit signal.

Figure 8:
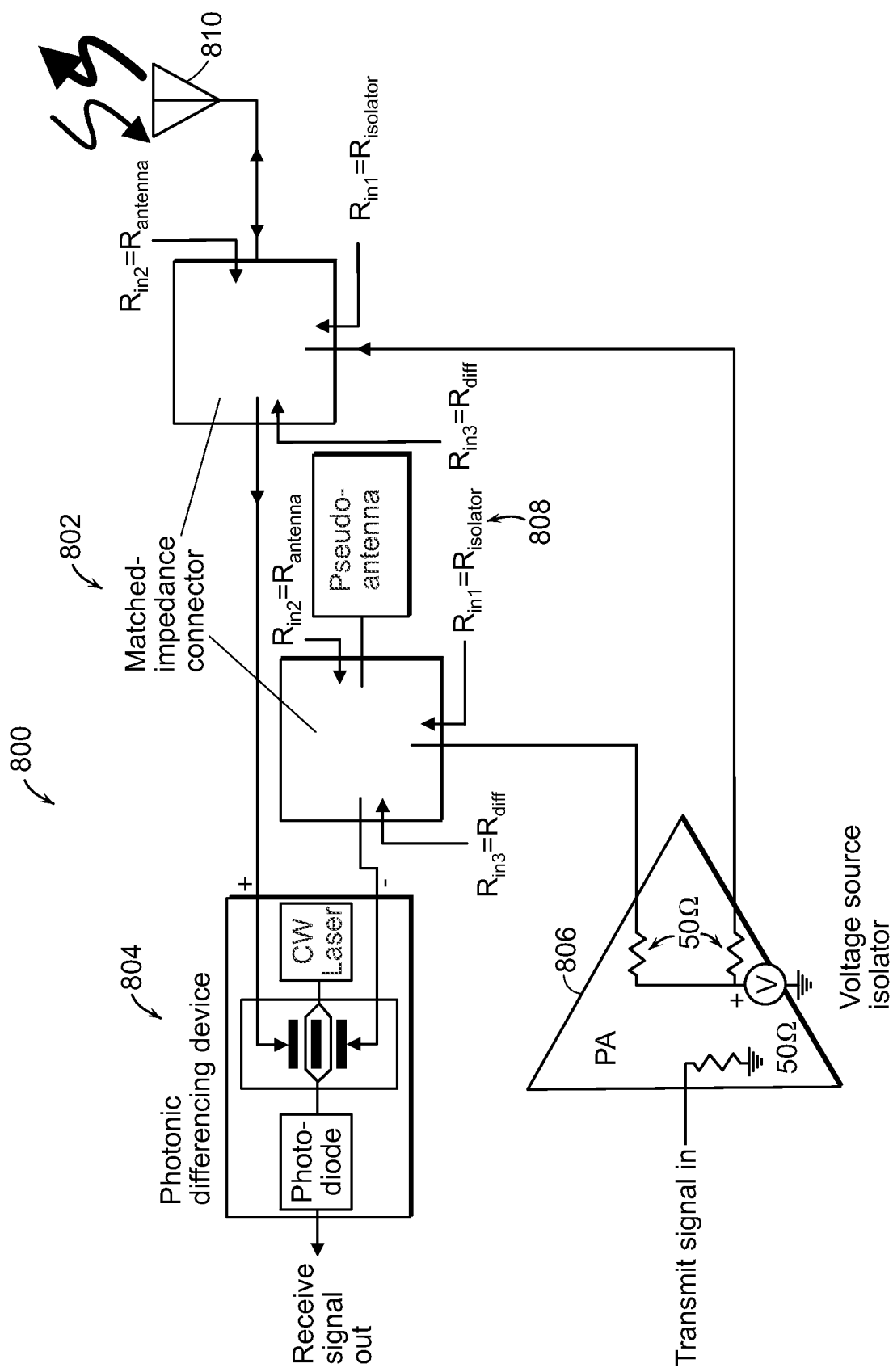
FIG. 8 illustrates a block diagram of one exemplary embodiment of a front-end system that includes the matched impedance signal connector, the photonic differencing circuit and the electronic voltage-source-based isolator described herein.

FIG. 8 illustrates a block diagram of a front-end system 800 that includes the matched impedance signal connector 802, the photonic differencing circuit 804 and the voltage-source isolator 806 as described herein. The system 800 passively reduces and ultimately even eliminates the need for the transmit signal adjustment device and the signal processor described herein. To accomplish this goal, the circuits on the two sides of the differencing device 804 are made as identical as possible. To this end, a pseudo-antenna 808 can be constructed, which is a circuit that replicates as closely as possible the impedance vs. frequency function of the antenna 810.

To further establish as good a balance as possible between the two inputs to the differencing device, identical connectors are used, in this case, the matched impedance type can be used. This example system uses the photonic differencing device described herein. Key advantages of this type of differencing device or subtractor are that they are extremely wide bandwidth (>4 decades) and there is high isolation between the + and − differencing ports. Voltage source isolation, with identical output impedance in the two outputs, further enhances the balance. One of the disadvantages of this system architecture is the relatively high loss incurred by the transmit signal. Because the same transmit power is supplied to both the antenna and the pseudo-antenna, there is 3 dB of loss for ideal (i.e., lossless) connectors. There is an additional 3 dB loss at each of the connectors. Thus, the total transmit loss between the output of the power amplifier and the antenna is 6 dB plus the excess loss of the connector.

Figure 9:
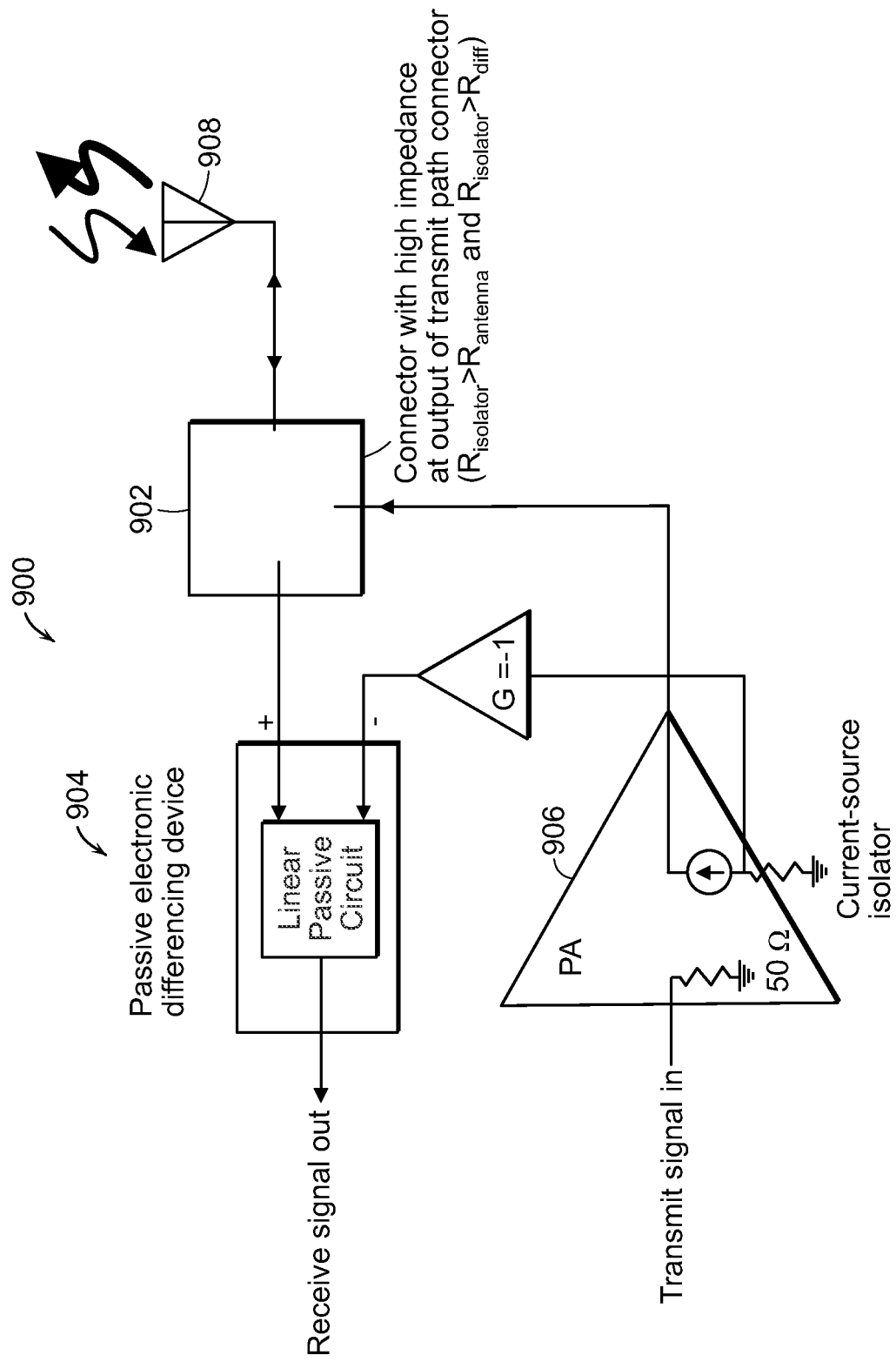
FIG. 9 illustrates a block diagram of one exemplary embodiment of a front-end system that includes the signal connector to which a high impedance is presented by the output of the transmit signal path, the passive electronic differencing device, and the current-source-based isolator described herein.

FIG. 9 illustrates a block diagram of one exemplary embodiment of a front-end system 900 that includes the signal connector 902 to which a high impedance is presented by the output of the transmit signal path, the passive electronic differencing device 904, and the current-source-based isolator 906 described herein. This is compatible with the version of the connector that has a high impedance on the port that connects to the transmit path output. In this system 900, the impedances on the other two connector ports are matched: the antenna port provides the load to the antenna 908 and the differencing port is loaded by one input to the differencing device 904, which in this system 900 is of the passive electronic type. The passive electronic differencing device 904 has a narrower bandwidth than the photonic differencing device described herein. However, it has slightly lower transmit loss: 4.77 dB ideally, vs. 6 dB for the architecture shown in FIG. 8.

Figure 10:
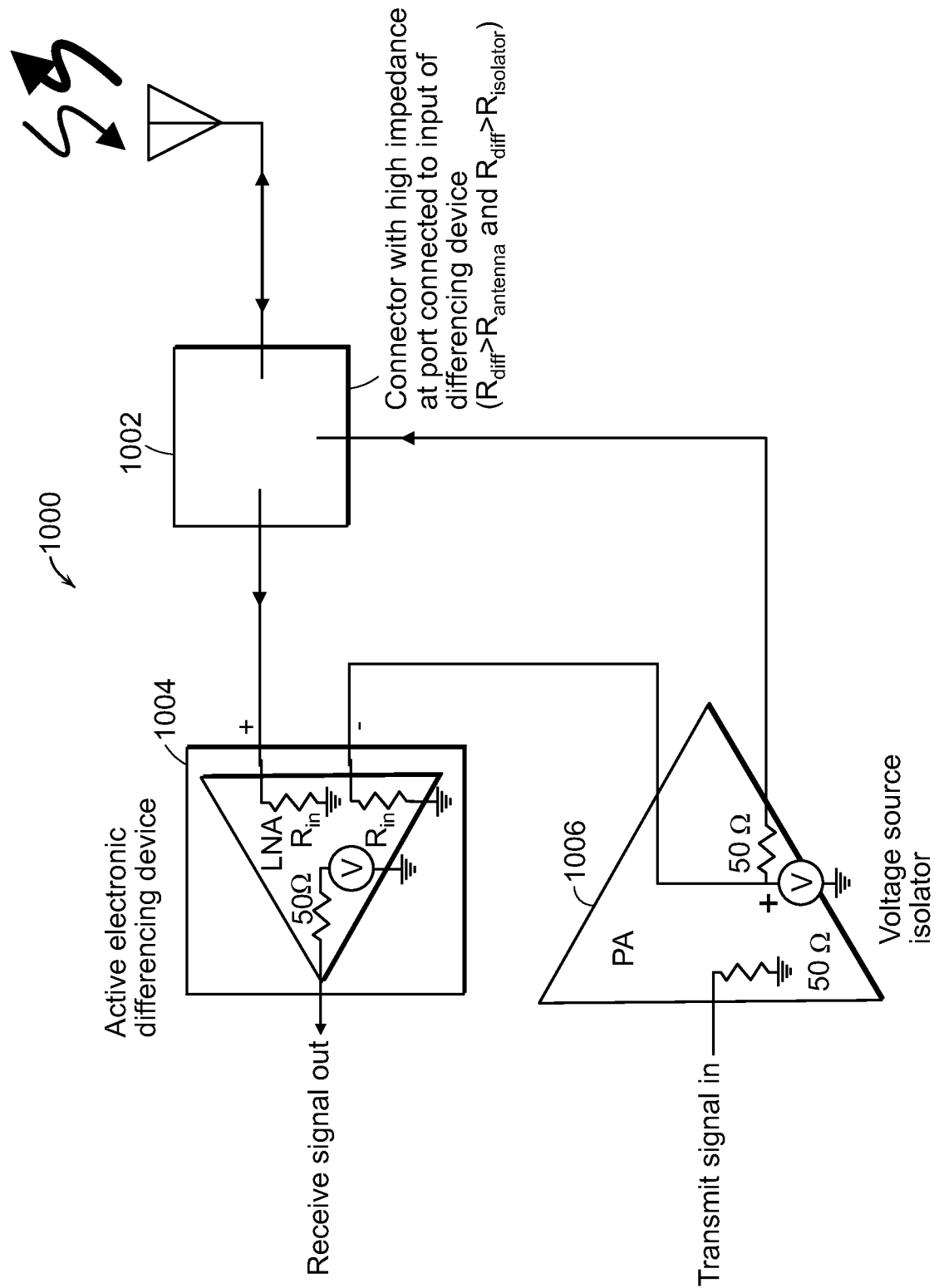
FIG. 10 illustrates a block diagram of one exemplary embodiment of a front-end system that includes the connector with a high impedance applied to the output receive signal port by the '+' port of the active electronic differencing device, and the voltage-source-based isolator described herein.

FIG. 10 illustrates a block diagram of one exemplary embodiment of a front-end system 1000 that includes a signal connector 1002 with a high impedance applied to the output receive signal port by the '+' port of the active electronic differencing device 1004, and the voltage-source-based isolator 1006 described herein. One potential advantage of differencing devices 1004 of this type is that the input impedance can be made higher than the system impedance. For example, a common system impedance is 50Ω. The input impedance of the active electronic differencing device 1004 can range from 500Ω for some implementations to >1 MΩ for other implementations. This means that the signal power drawn by the differencing device inputs can be negligible. Therefore, it is advantageous to select a connector type that is designed to work with a high impedance at its port that feeds the differencing device and to use the voltage type of isolators whose isolated output is designed to feed a high impedance. Hence the system configuration that is shown in FIG. 10 contains both a voltage source isolator 1006 and a signal connector 1002 with high impedance at its differencing device port. One of the key features of this implementation is that the transmit loss is now 0 dB, at least in the ideal case.

Figure 11:
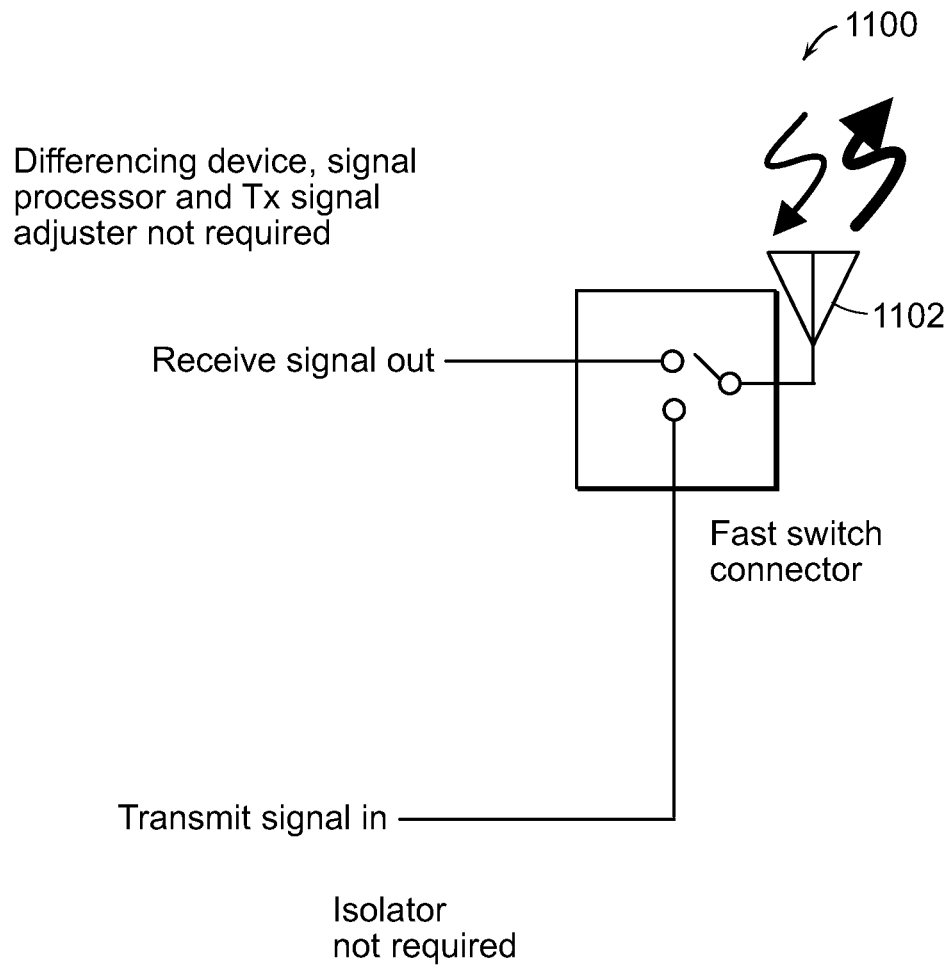
FIG. 11 shows a same-aperture any-frequency STAR system using a fast switch as a signal connector.

FIG. 11 shows a same-aperture any-frequency STAR system 1100 using a fast switch as a signal connector. The configuration leads to a particularly simple implementation of the present teaching. The basis of operation of this implementation can be understood as follows. It is well known to those in the art that a continuous signal can be completely characterized by sampling it at a rate that is at least twice its maximum frequency component. This is often referred to as the Nyquist sampling theorem. One of the consequences of Nyquist sampling is that it is not necessary to continuously monitor a continuous signal: observing—i.e., sampling—a continuous signal at its Nyquist rate is sufficient. Instantaneous sampling—i.e. in zero time—is obviously a theoretical abstraction. For practical engineering purposes, a sample is considered to be instantaneous if the length of the sampling interval is short compared to the interval between samples. For example, a sampling pulse that lasts for even 1% of the time interval between samples is often considered as sufficiently short that it approximates the theoretically ideal sampling.

To implement sampling, one can use a fast switch that is capable of connecting the input—in this case the signal coming from the antenna 1102—to the receiver for the short period of time of the sample, and then opening—i.e. disconnecting the input from the receiver. This means that for the remaining 99% of the time between samples, the sampling switch is open, and hence the receiver is not connected to the input. The fast switch connector 1100 utilizes the inter-sampling interval to connect the transmitter to the antenna 1102. There is negligible transmitter power loss since the transmitter is connected to the antenna 1102 for almost 100% of the time. With the fast switch signal connector, the transmitter and the receiver are never simultaneously connected to the antenna 1102. Hence, the transmit signal does not have the opportunity to enter the receive path. This can eliminate the need for the differencing device, isolator, signal processor and transmit signal adjuster described herein for some applications It is important to point out that, while the fast switch is topologically similar to a conventional transmit-receive (T/R) switch in systems not designed for STAR, the function of the fast switch connector shown in FIG. 3D is distinct. In the case of a conventional T/R switch, the switch only needs to operate with speeds between tens of milliseconds and one second. Hence a conventional T/R switch does not operate fast enough to perform the sampling function, which is central to the present operation.

Although in some system applications, sufficient performance may be achievable using the same-aperture any-frequency STAR systems described in FIGS. 2-11, in other system applications it will be necessary to augment the front end performance with signal processing techniques. In any embodiment of the present teaching, signal processing can be incorporated with the front end to achieve enhanced performance. As will be evident to those skilled in the art, it is possible to augment any of the front end systems described herein with signal processing; we illustrate this by selecting to augment the example front end system architecture shown in FIG. 10.

Figure 12:
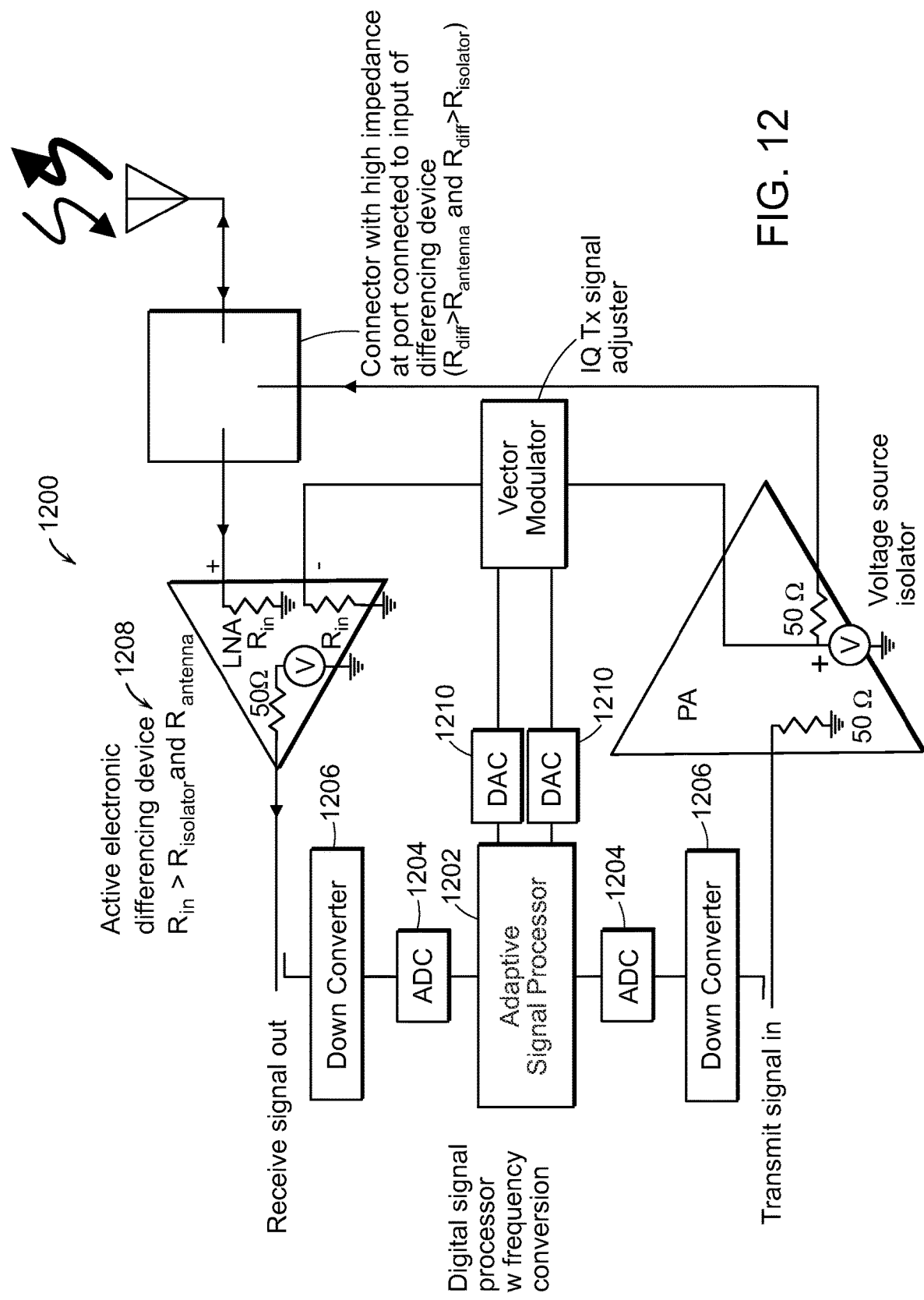
FIG. 12 shows a block diagram of a same-aperture any-frequency STAR system 1200 using digital signal processing 1202 to augment the example front end system shown in FIG. 10.

FIG. 12 shows a block diagram of a same-aperture any-frequency STAR system 1200 using digital signal processing 1202 to augment the example front end system shown in FIG. 10. This example system uses the digital signal processor with down conversion described in connection with FIG. 6B. Also, this example system uses the vector modulator type of transmit signal adjuster described in connection with FIG. 7B. A portion of the output of the differencing device is fed to a downconverter 1206 that translates the frequency spectrum of the signal down to a lower frequency, which can be an intermediate frequency (IF). Alternatively, it can be translated all the way down to zero frequency, which is more commonly referred to as baseband. A portion of the transmit signal is also downconverted, with the constraint that it be converted to the same frequency to which the output of the differencing device was converted. Once both these signals have been downconverted, they are converted to digital form via analog-to-digital converters (ADC) 1204.

In the digital domain, the digital signal processor 1202 is used to correlate the transmit signal with the differencing device 1208 output to isolate the residual transmitter component in the differencing device 1208 output. The signal processor 1202 then forms an estimate of the optimum complex value of the transmitter signal that needs to be injected into the differencing device 1208 so as to minimize the residual transmitter signal that is present at the differencing device 1208 output. The output of the signal processor 1202 includes two signals that contain the desired settings on the transmit signal adjuster. Since in this example, we are using a vector modulator, the complex settings are for the in-phase (I) and quadrature (Q) portions of the transmitter signal. Since many vector modulators require analog inputs, FIG. 12 shows digital-to-analog converters (DACs) 1210 to execute the required conversion.

Figure 13:
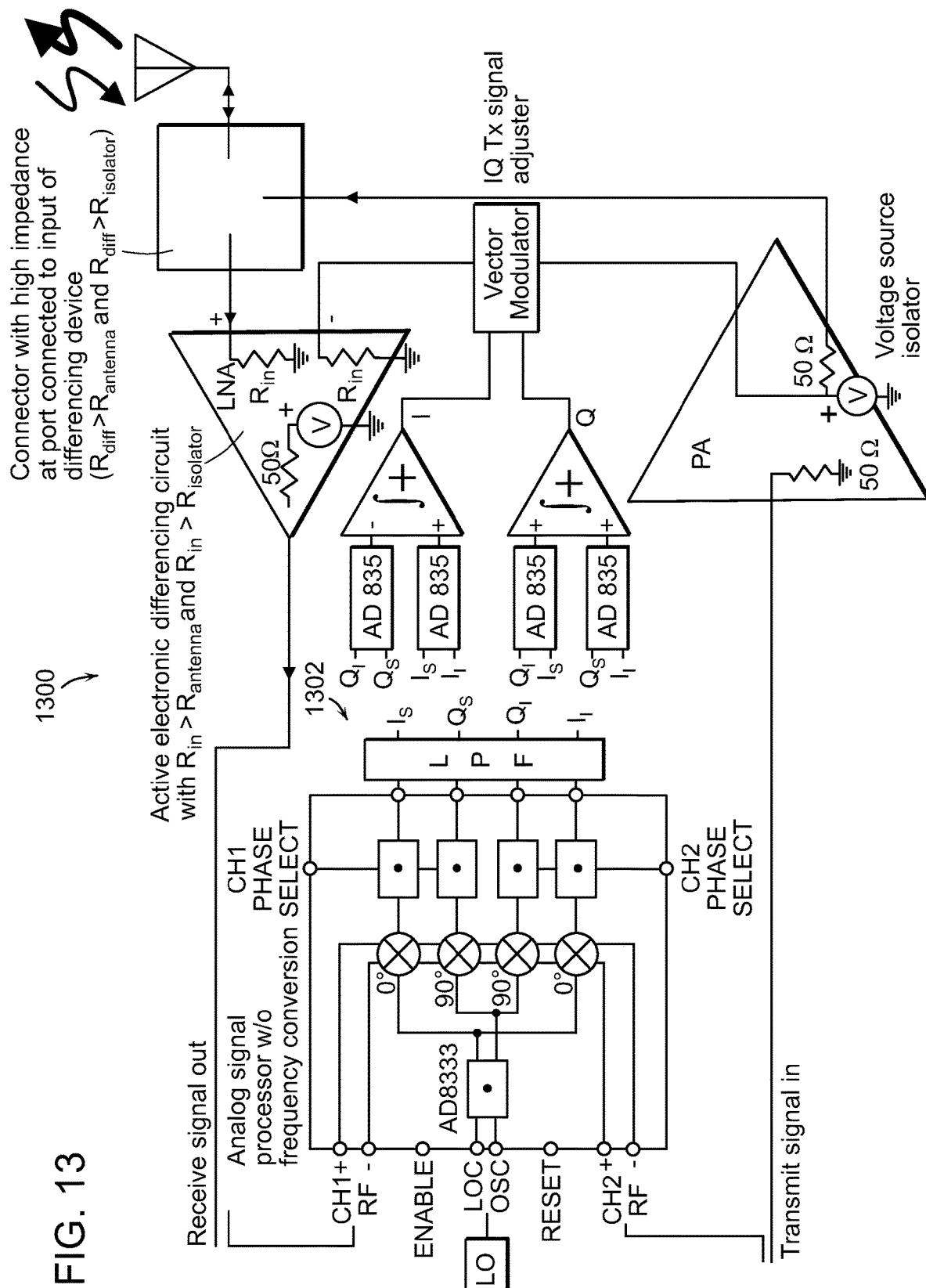
FIG. 13 shows a block diagram of a same-aperture any-frequency STAR system illustrating how analog signal processing could be used to augment the example front end system shown in FIG. 10.

FIG. 13 shows a block diagram of a same-aperture any-frequency STAR system 1300 illustrating how analog signal processing could be used to augment the example front end system shown in FIG. 10. For this example system, we have selected the analog signal processor 1302 without frequency conversion as described in connection with FIG. 6C. Since the transmitter and differencing device outputs are analog signals, the analog signal processor 1302 does not require analog-to-digital converters. One way that the required processing can be performed is with an integrated circuit that contains many of the functions, such as the AD8333, which is a dual I/Q demodulator commercially available from Analog Devices. The required analog multiplications also can be performed with integrated circuits, such as the AD835, which is a voltage-output, 4-quadrant multiplier also commercially available from Analog Devices. The output of the analog multipliers, with appropriate summing, scaling and integration, can drive the vector modulator inputs directly without the need for digital-to-analog coverers.

All of the embodiments of the present teaching in FIGS. 2-13 would be effective at removing the high-power transmit signal from the receive path. If the transmit signal strength is only of the same order of magnitude as, or smaller in magnitude than, the receive signal, then much less hardware may be required.

Figure 14:
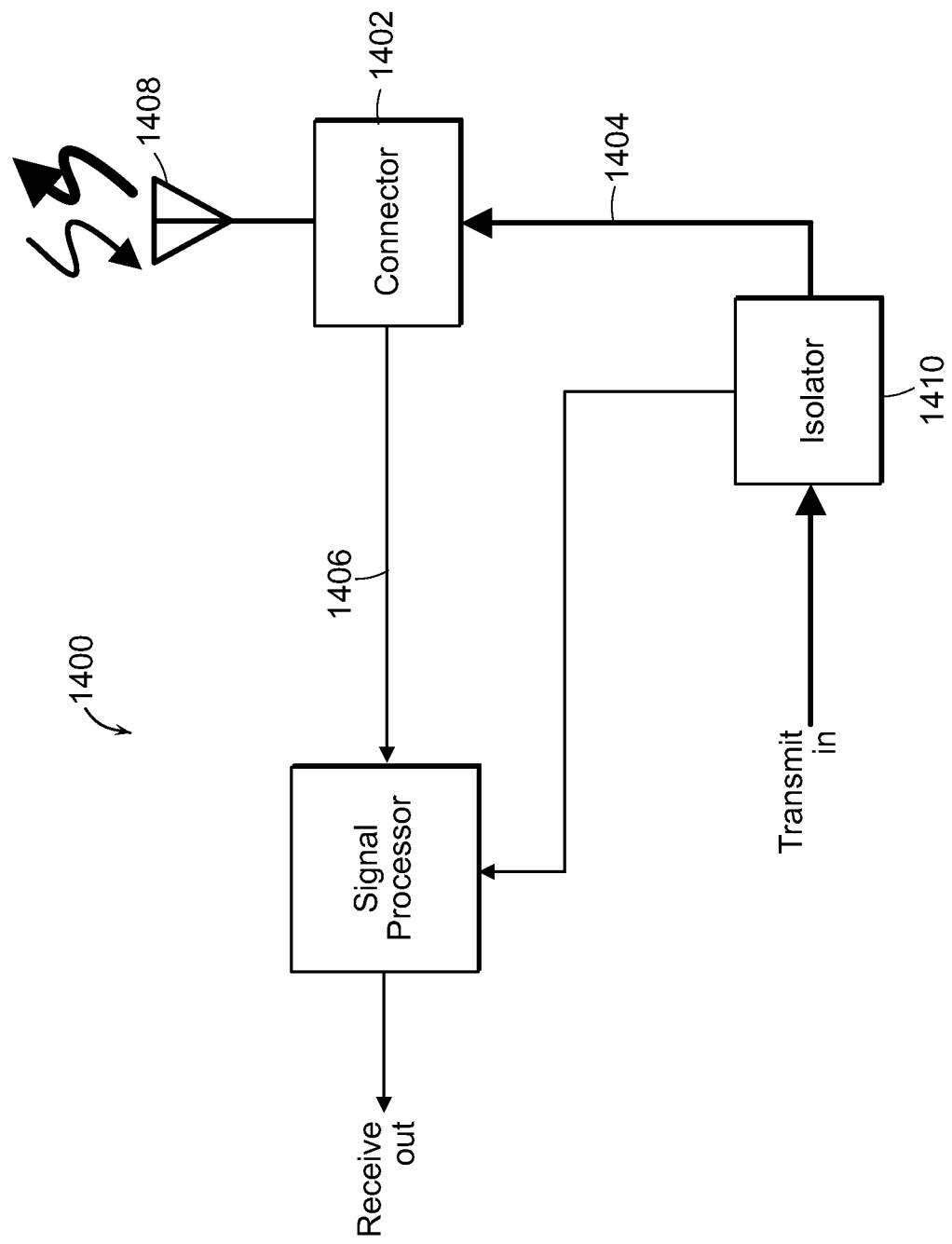
FIG. 14 illustrates a subset of hardware in the same-aperture any-frequency STAR system described in connection with FIG. 2 that is useful for some embodiments when the transmit signal strength is only as strong as or weaker than the receive signal.

FIG. 14 illustrates a subset system 1400 of hardware in the same-aperture any-frequency STAR system described in connection with FIG. 2 that is useful for some embodiments when the transmit signal strength is only as strong as or weaker than the receive signal. A three-port signal connector 1402 is necessary to permit connection of the separate transmit path 1404 and receive signal path 1406 to the antenna 1408, and the isolator 1410 is necessary to shield the transmit path 1404 from the signal environment in which the antenna operates. An analog signal differencing device, however, may not be required, and thus neither would the transmit signal adjuster be required. Because the transmit signal is relatively small, it does not saturate any of the components in the receive signal path, and its removal from the receive signal path, if deemed necessary, can be accomplished using well-known digital signal processing techniques.

Figure 15:
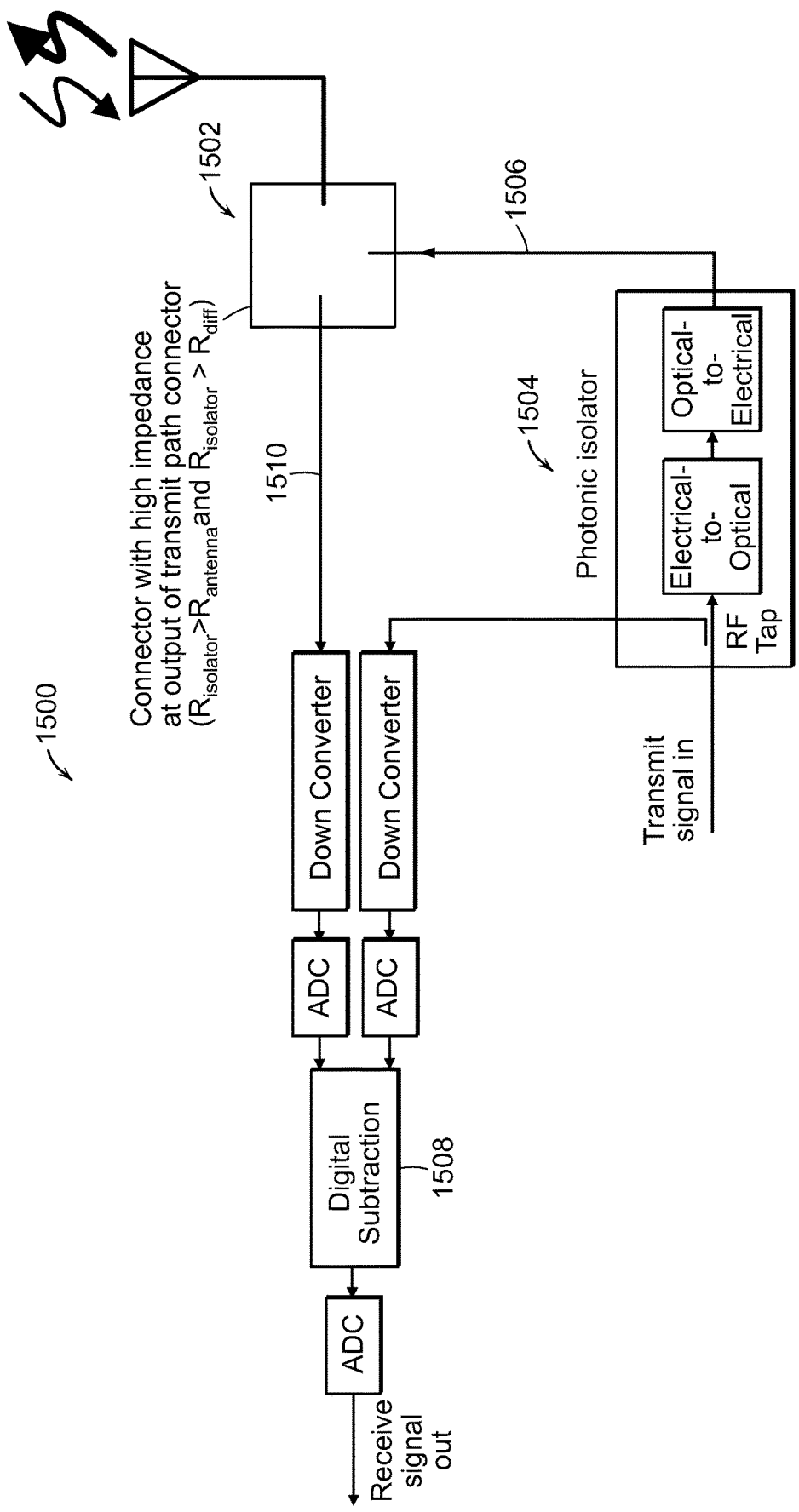
FIG. 15 illustrates one exemplary embodiment of the system described in FIG. 14, including a signal connector to which a high impedance is presented by the output of the photonic isolator in the transmit signal path, and in which conventional digital signal processing is used to remove the transmit signal from the receive path after all signals are frequency down-converted and then converted from the analog to digital domain.

FIG. 15 illustrates one exemplary system 1500 which is an embodiment of the system 1400 in FIG. 14, including a signal connector 1502 to which a high impedance is presented by the output of the photonic isolator 1504 in the transmit signal path 1506, and in which a conventional digital signal processor 1508 is used to remove the transmit signal from the receive path 1510 after all signals are frequency down-converted and then converted from the analog to digital domain. In the case of non-cooperative interfering sources, a reference copy of the interferers that is fed to the interference canceller must be self-generated. Except for the fact that problematic interferers are large in amplitude relative to the signal of interest (SOI), we often cannot assume we know anything else about these interferers at all. Therefore, to generate a reference copy of the interferers requires a way of sensing only the large interferers that may be present and ignoring the SOI. A known method to preferentially detect the interfering source is to use directional antennas whose maximum sensitivity is pointed in the direction of the interfering source. The effectiveness of such techniques, however, is heavily dependent on the directionality of the antenna beam and the angle separation between the interfering source and the SOI. Therefore, one feature of the present teaching is an approach for extracting a reference copy of a strong interfering signal from the composite SOI+interfering signal stream that is coming from an antenna.

Figure 16:
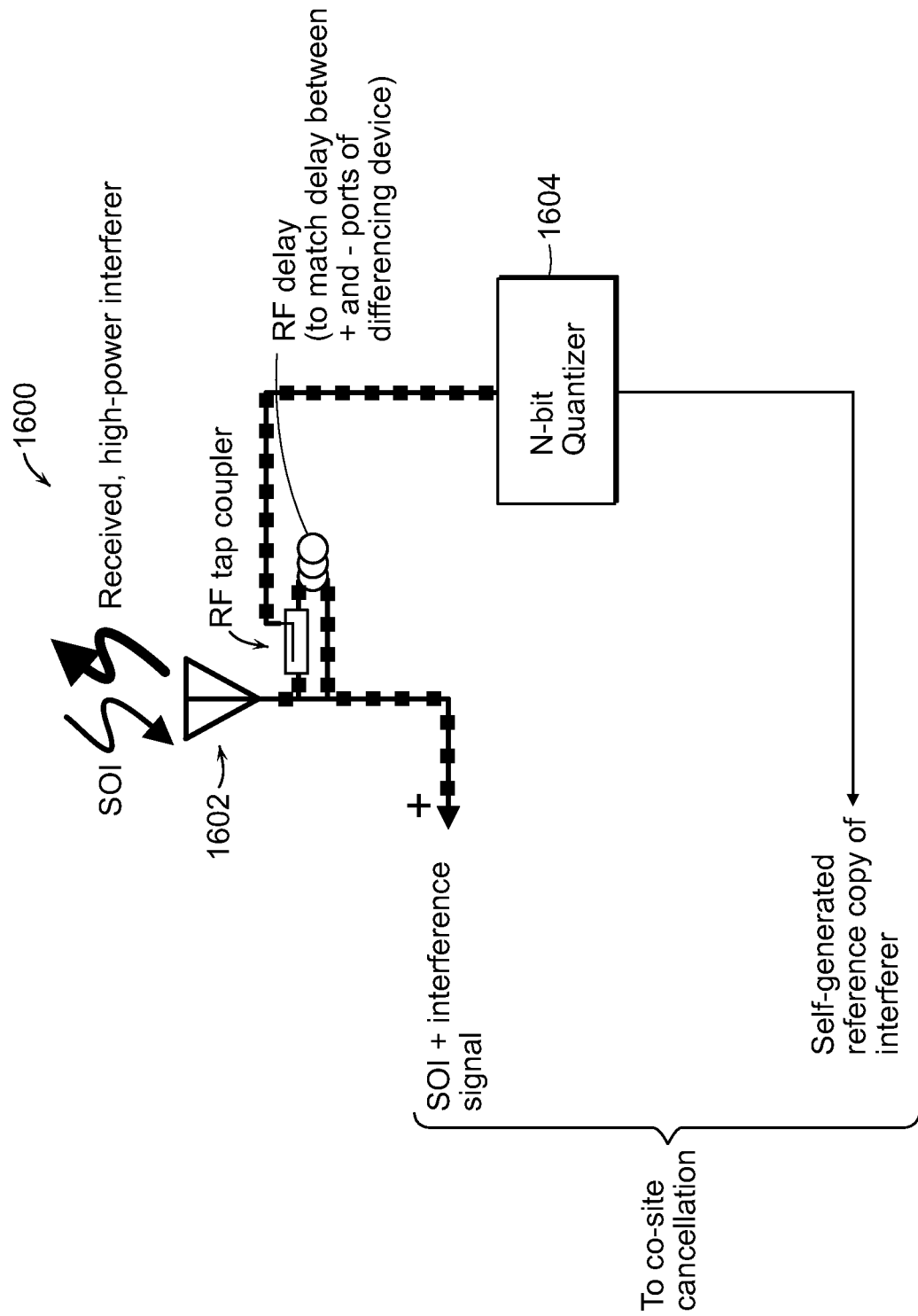
FIG. 16 illustrates a system that generates a reference copy of an interfering signal according to the present teaching.

FIG. 16 illustrates a system 1600 that generates a reference copy of an interfering signal according to the present teaching. A portion of the antenna 1602 output is tapped off and fed to an N-bit quantizer 1604, where N is sufficient to quantize the strong interferer but not sufficiently large to also quantize the SOI, which is much smaller than the interfering signal. In this way, the N-bit quanitzer serves as a sort of a reverse limiter, letting only large signals through and suppressing smaller signals. The delay involved in producing a reference copy of the interferers in this way and processing it in the interference canceller can be reproduced in the signal path leading from the antenna 1602 to the interference canceller as shown in FIG. 16. To demonstrate the operation of the self-generated reference, simulations were performed, in which the "high-power" interferer was a 1-V sine wave at 100 MHz and the "low power" SOI was a 0.1-V sine wave at 107 MHz.

Figure 17:
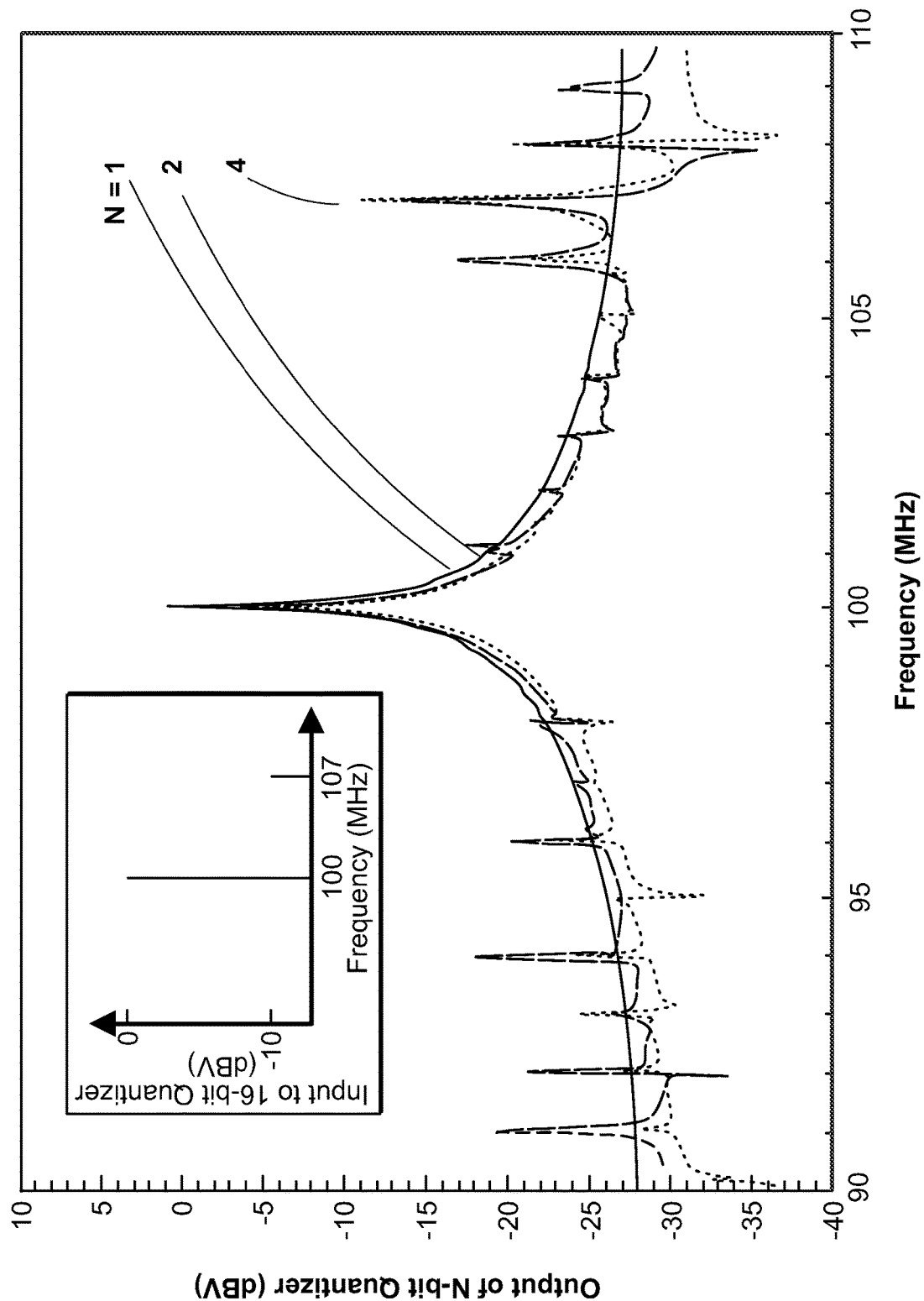
FIG. 17 illustrates results of a simulation of the architecture in FIG. 16, whereby the output of a 1-bit quantizer produces a copy of the high-power interferer at 100 MHz, allowing its subtraction from the lower-power 107-MHz SOI in a differencing device.

FIG. 17 illustrates results of a simulation of the architecture in FIG. 16, whereby the output of a 1-bit quantizer produces a copy of the high-power interferer at 100 MHz, allowing its subtraction from the lower-power 107-MHz SOI in a differencing device. The plots illustrated in FIG. 17 show the input to the N-bit quantizer, while the main plot shows the output of the quantizer, with the number of bits as a parameter. With the interferer only a factor of 10 times stronger than the SOI, a single bit of quantization "passes"

the large interferer and completely fails to sense the smaller SOI, and 4 bits are sufficient to completely sense both the interferer and SOI. With 2 bits, the SOI is ~20 dB below the high-power interferer.

Given that we will wish to cancel large interferers with more complicated spectral content than the simple sinusoid, we assumed in this simulation that we will need multiple bits of quantization to preserve this content. Thus, we will only be able to effectively cancel the effect of interferers much (not just 10 dB) stronger than the SOI.

Figure 18:
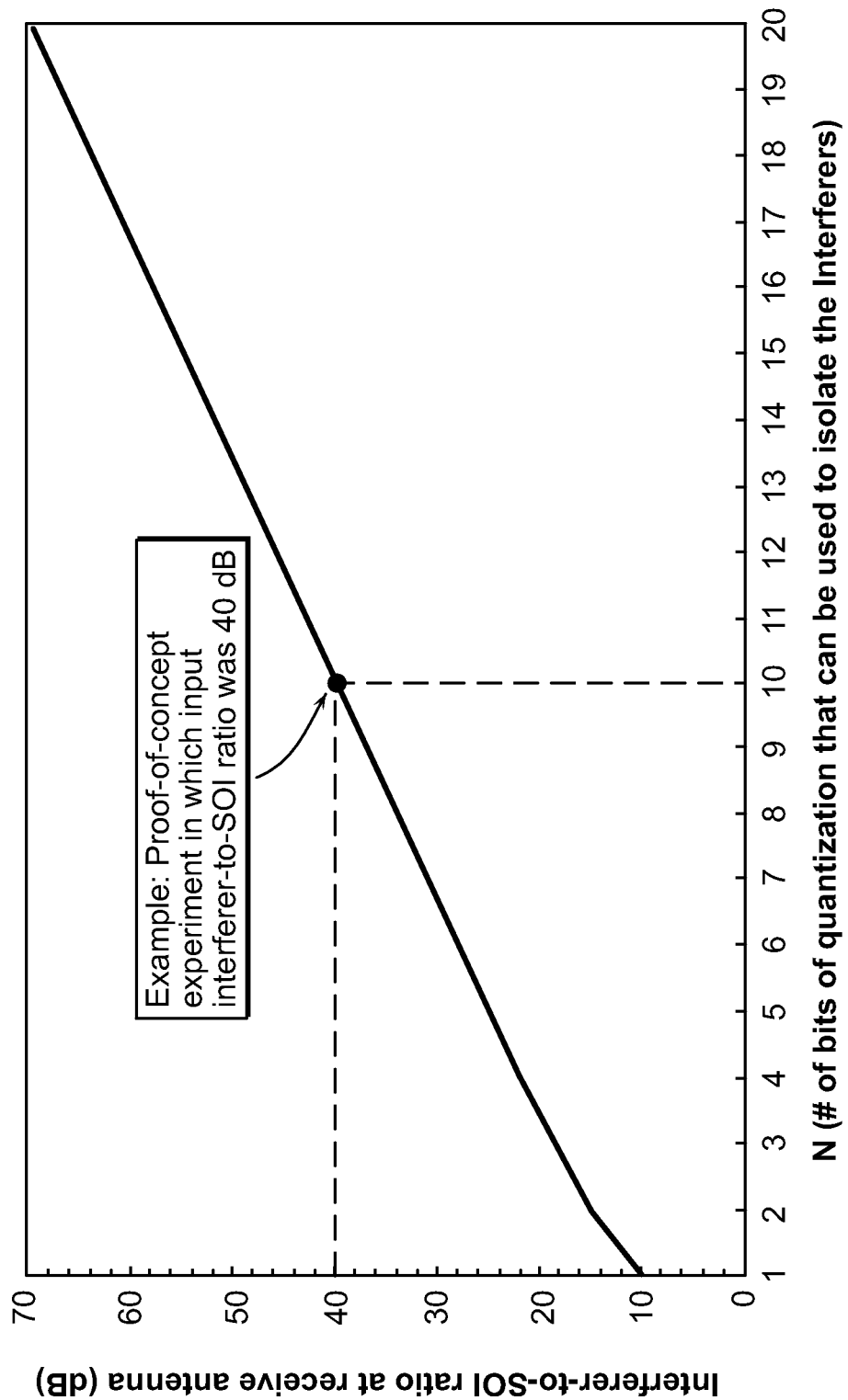
FIG. 18 is a plot that shows the relationship between the signal-to-interferer ratio at the antenna to the number of bits of quantization that we can use without having to worry about suppressing the SOI.

FIG. 18 is a plot that shows the relationship between the signal-to-interferer ratio at the antenna to the number of bits of quantization that we can use without having to worry about suppressing the SOI, which is like throwing the SOI "baby" out with the interferer(s) "bathwater." The number of bits is a metric of the complexity of the interference signal spectrum.

Figure 19:
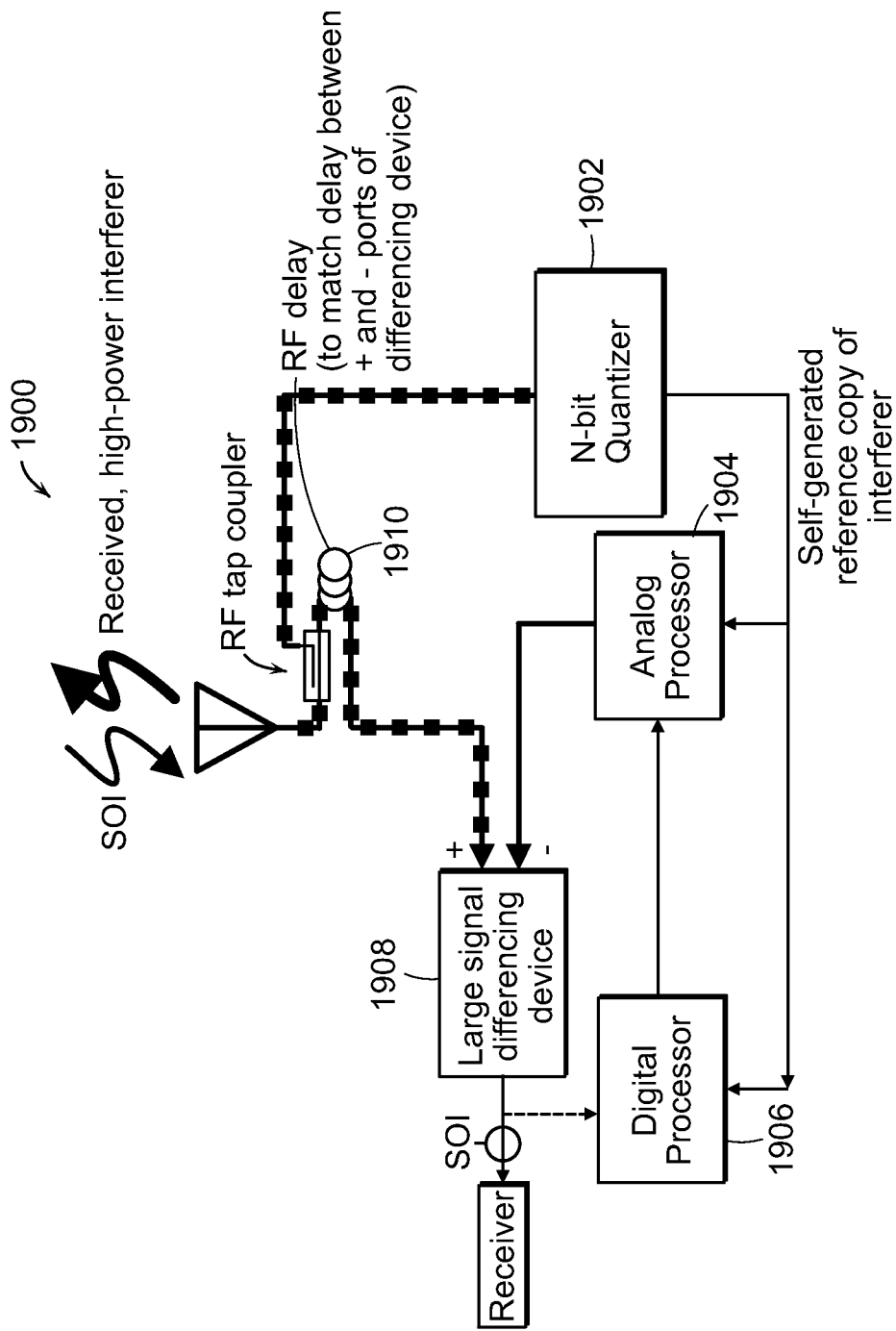
FIG. 19 illustrates a block diagram of a system according to the present teaching that uses a self-generated reference in an interference canceller.

FIG. 19 illustrates a block diagram of a system 1900 according to the present teaching that uses a self-generated reference in an interference canceller. The system 1900 includes the N-bit quantizer 1902 that generates the reference copy of the interferer as described in connection with FIG. 16. An analog processor 1904 and a digital processor 1906 are used in a feedback loop with the large signal differencing device 1908 to remove the interfering signal. An RF delay 1910 is used to match the delay between the + and − ports of the differencing device 1908.

FIGS. 2-19 relate to systems in which the transmitting and receiving antenna consists of one radiating element addressed by one front-end. Alternatively, the antenna symbol in FIGS. 1, 2, 8-16, and 19 can represent an array of radiating elements all being fed the same transmit signal by a single front-end and having their received signals combined for processing in that same front-end. In many practical systems, it is more advantageous, however, for each radiating element or small group of radiating elements in a large array of such elements to be addressed by its own front-end. In this case, each front-end may need to mitigate the effect of the presence in its receive signal path of not only the transmit signal being transmitted by its radiating element or small group of radiating elements, but also by the signals being transmitted by any or all of the other elements in the array whose transmitted signals will be received in part by this front-end's antenna element through a phenomenon known in the art as mutual coupling between antenna elements.

Figure 20:
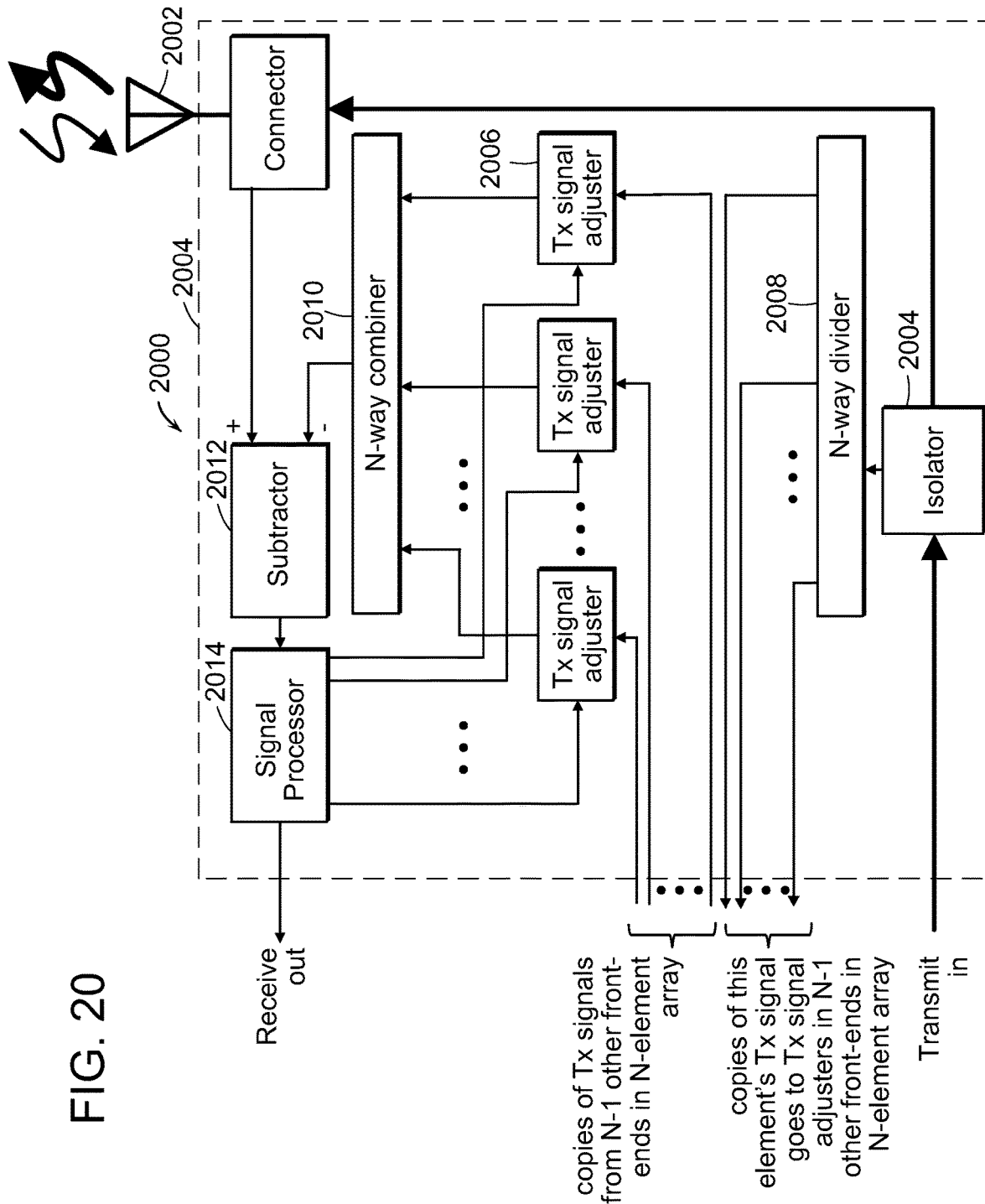
FIG. 20 illustrates a system according to the present teaching for mitigating the effect of signals being transmitted not only by the antenna element attached to the front-end shown in the collection of hardware inside dashed box but also by the N−1 other radiating elements in an array of N such radiating elements.

FIG. 20 illustrates a system 2000 according to the present teaching for mitigating the effect of signals being transmitted not only by the antenna element 2002 attached to the front-end 2004 shown by the collection of hardware inside dashed box but also by the N−1 other radiating elements in an array of N such radiating elements.

The system 2000 is a generalized form of the single-element front-end described in connection with FIG. 2. The difference between the two figures is noticeable in that there are now a number N rather than only one transmit signal adjuster. That is one for each of the N elements in the antenna array. The copy of the transmit signal which, in the single-antenna-system front-end of FIG. 2, the isolator 2004 provides to a single transmit signal adjuster 2006, is now split into N parts by an N-way RF divider 2008, such as two-way traveling-wave resistive power dividers (Wilkinson dividers) employed in a corporate tree arrangement to yield N-way splitting of the signal.

One of the N attenuated (by at least a factor of N) copies of the transmit signal is fed to this front-end's transmit signal adjuster 2006 exactly as was done in FIG. 2. The remaining N−1 attenuated copies of this front-end's transmit signal are routed out of this front-end, and each is connected to one of the transmit signal adjusters 2006 in each of the N−1 other antenna element 2002 front-ends 2004. Correspondingly, each of the other N−1 transmit signal adjusters 2006 in the one element's front-end 2004 shown in FIG. 20 receives an attenuated copy of the signal being transmitted by the other N−1 antenna elements 2002. These signal adjuster's 2006 outputs are combined, along with the output of the transmit signal adjuster 2006 that acts upon this antenna element's transmit signal, in an N-way RF combiner 2010, as shown in FIG. 20.

Identical to the N-way RF divider 2008, this N-way RF combiner 2010 may consist, for example, of two-way traveling-wave resistive power combiners (Wilikinson power combiners) employed in a corporate tree arrangement to yield N-way combining of the RF signals. The combined copies of the transmit signals are subtracted from the signal received by this front-end's antenna element 2002 in the differencing device 2012. As in FIG. 2, the output of the differencing device 2012 is fed to a signal processor 2014. Additionally, the signal processor 2014 receives its own attenuated copy of each element's transmit signal as the signal processor in FIG. 2 does. For clarity, however, this feature is not shown in FIG. 20, but will be understood by those skilled in the art.

What is claimed is:

1. An any-frequency simultaneous transmit and receive (STAR) system, the system comprising:
   a) a first antenna element that transmits a first RE transmit signal and that receives an RF receive signal;
   b) a second antenna element that transmits a second RF transmit signal, wherein the first and second RF transmit signals and the RF receive signal occupy any RF frequency;
   c) a signal connector configured to connect a path to and from the first antenna element, a path from an output of a transmit path and an input of a receive path;
   d) a first transmit signal adjuster comprising an input connected to the transmit path;
   e) a second transmit signal adjuster, wherein an output of the first transmit signal adjuster and an output of the second transmit signal adjuster are combined at an output of a combiner;
   f) a signal differencing device comprising a first input connected to the receive path and a second input connected to the output of the combiner, the signal differencing device being configured to receive combined copies of the first and second RF transmit signals and to subtract them from the RE receive signal, thereby mitigating an effect of both the first and the second RF transmit signals on the RF receive signal; and
   g) a signal processor comprising an input connected to an output of the signal differencing device, an output connected to an input of the first transmit signal adjuster and connected to an input of the second transmit signal adjuster and connected to a receive output, the signal processor being configured to receive attenuated combined copies of the first and second RF transmit signals and to determine a complex value of at least one of the first and second RF transmit signals so as to minimize at least one of residual first and second RF transmit signals in the RF receive signal at the receive output.

2. The system of claim 1 wherein the signal connector provides a matched impedance for at least one of the path from and to the first antenna element, the path from the output of the transmit path, and the path to the input of the receive path.

3. The system of claim 1 wherein the signal connector provides a higher impedance at the path from the output of the transmit path than at either of the path to and from the first antenna element and the path from the output of the transmit path.

4. The system of claim 1 wherein the signal connector comprises a fast switch.

5. The system of claim 1 wherein signal differencing device comprises an active differencing device.

6. The system of claim 1 wherein the signal differencing device comprises a passive differencing device.

7. The system of claim 1 wherein the signal differencing device comprises a photonic differencing device.

8. The system of claim 1 wherein an algorithm executed by the signal processor correlates a copy of at least one of the first and second RF transmit signal with the output of the differencing device and generates a more accurate representation of the RF receive signal.

9. The system of claim 1 wherein the signal processor comprises an analog signal processor.

10. The system of claim 1 wherein the signal processor comprises a digital signal processor.

11. The system of claim 1 wherein the first and second RF transmit signal comprise a same transmit signal.

12. The system of claim 1 wherein the first and second RF transmit signal comprise a different transmit signal.

13. The system of claim 1 wherein the system comprises a microwave system.

\* \* \* \* \*